United States Patent
Hemminghaus et al.

(10) Patent No.: US 12,256,730 B2
(45) Date of Patent: Mar. 25, 2025

(54) MICROENCAPSULATED HERBICIDES

(71) Applicant: MONSANTO TECHNOLOGY LLC, Saint Louis, MO (US)

(72) Inventors: John W. Hemminghaus, Chesterfield, MO (US); Neha Rana, Chesterfield, MO (US); Steven T. Voss, Edwardsville, IL (US); Junhua Zhang, Chesterfield, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 0 days.

(21) Appl. No.: 18/441,132

(22) Filed: Feb. 14, 2024

(65) Prior Publication Data
US 2024/0306638 A1 Sep. 19, 2024

Related U.S. Application Data

(63) Continuation of application No. 17/459,030, filed on Aug. 27, 2021, now Pat. No. 11,937,599, which is a continuation of application No. 16/620,833, filed as application No. PCT/US2018/037226 on Jun. 13, 2018, now Pat. No. 11,129,381.

(60) Provisional application No. 62/518,965, filed on Jun. 13, 2017.

(51) Int. Cl.
| | | |
|---|---|---|
| *A01N 25/04* | (2006.01) | |
| *A01N 25/28* | (2006.01) | |
| *A01N 37/10* | (2006.01) | |
| *A01N 37/22* | (2006.01) | |
| *A01N 37/26* | (2006.01) | |
| *A01N 37/40* | (2006.01) | |
| *A01N 43/707* | (2006.01) | |

(52) U.S. Cl.
CPC ............. *A01N 25/28* (2013.01); *A01N 25/04* (2013.01); *A01N 37/10* (2013.01); *A01N 37/22* (2013.01); *A01N 43/707* (2013.01)

(58) Field of Classification Search
CPC ........ A01N 25/28; A01N 25/04; A01N 37/10; A01N 37/22; A01N 43/707; A01N 37/26; A01N 37/40
See application file for complete search history.

(56) References Cited

FOREIGN PATENT DOCUMENTS

WO WO2012024524 * 2/2012 ............. A01N 25/28

* cited by examiner

*Primary Examiner* — Trevor Love
(74) *Attorney, Agent, or Firm* — Harness, Dickey & Pierce, P.L.C.

(57) ABSTRACT

Herbicidal microcapsules containing a combination of herbicides are described. In particular, the herbicidal microcapsules include a core material comprising an acetamide herbicide and a second herbicide and a shell wall encapsulating the core material. Also described are processes for preparing the microcapsules, various herbicidal compositions containing the microcapsules, and methods of preparing and using the herbicidal compositions.

19 Claims, 1 Drawing Sheet

MICROENCAPSULATED HERBICIDES

REFERENCE TO RELATED APPLICATIONS

This application is a continuation of U.S. application Ser. No. 17/459,030, filed Aug. 27, 2021, which is a continuation of U.S. application Ser. No. 16/620,833, filed Dec. 9, 2019, issued as U.S. Pat. No. 11,129,381, which is the 371 National Stage Application of International PCT Application No. PCT/US2018/037226, filed Jun. 13, 2018, which claims the benefit of U.S. Provisional Patent Application No. 62/518,965, filed Jun. 13, 2017, the contents of which are incorporated herein by reference in their entirety.

FIELD OF THE INVENTION

The present invention generally relates to herbicidal microcapsules containing a combination of herbicides. In particular, the present invention relates to herbicidal microcapsules comprising a core material comprising an acetamide herbicide and a second herbicide and a shell wall encapsulating the core material. The present invention also relates to processes for preparing these microcapsules. Further, the present invention relates to various herbicidal compositions containing these microcapsules and methods of preparing and using these herbicidal compositions.

BACKGROUND OF THE INVENTION

Microencapsulation of herbicides is one method for controlling the release of the herbicide after application, particularly when sustained or slow release of the herbicide is desired. In the case of certain herbicides, the release rate needs to be controlled so that crop injury can be managed. For example, in the case of acetamide herbicides, sustained release is desired because injury to susceptible crops has been observed with some application sprays prepared from conventional emulsifiable concentrate formulations (non-encapsulated herbicide formulations). Also, slower release can beneficially provide for longer residual weed control activity.

Crop injury caused by some applications of acetamide herbicides necessitated strategies, such as microencapsulation, to reduce this effect. Methods for producing microencapsulated acetamides are described in various patents and publications including U.S. Pat. No. 5,925,595; U.S. Publication No. 2004/0137031; and U.S. Publication No. 2010/0248963. Generally, to form microcapsules, the herbicide is encapsulated in a polymeric shell wall material. The herbicide is released from the microcapsules at least in part by molecular diffusion through the shell wall. Several factors including the type of herbicide, type of polymer, shell thickness, shell porosity, particle size, and presence of safeners can impact the rate of release of the herbicide from the microcapsules and/or crop safety associated with the microcapsules.

The emergence of certain herbicide resistant weeds has generated interest in developing strategies to supplement the action of primary herbicides such as glyphosate. Acetamide herbicides are known as effective residual control herbicides that reduce early season weed competition. In particular, acetamide herbicides such as acetochlor provide outstanding residual control of many grasses and broadleaf weeds including pigweed, waterhemp, lambsquarters, nightshade, foxtails, among others. Acetamides are generally classified as seedling growth inhibitors. Seedling growth inhibitors are absorbed and translocated in plants from germination to emergence primarily by subsurface emerging shoots and/or seedling roots. Acetamide herbicides typically do not offer significant post-emergence activity, but as a residual herbicide provide control of newly emerging monocots and small-seeded dicot weed species. This supplements the activity of post-emergence herbicides that lack significant residual activity.

Herbicide compositions containing a combination of herbicides with multiple modes of action that can supplement the action of primary herbicides such as glyphosate are especially suited for controlling growth of unwanted plants, including those with selected herbicide resistance. Although tank mixing of additional unencapsulated herbicides with microencapsulated acetamides is effective for some applications, compositions that contain microcapsules containing multiple herbicides actives would be advantageous, especially when herbicide actives have the potential to cause crop injury under certain methods of application.

Addressing the need for microcapsules containing multiple herbicides actives has been challenging because the release properties of microencapsulated acetamide herbicides can be highly sensitive to the inclusion of additives in the formulation and particularly sensitive to additives in the core material of the microcapsules. Also, the herbicide actives must be compatible with both the microencapsulation process as well as the shell wall material such that the microcapsules exhibit stability over a wide range of storage conditions. Thus, there remains a need for stable herbicidal microcapsules that contain multiple actives that provide for different modes of herbicidal activity.

BRIEF SUMMARY OF THE INVENTION

Various aspects of the present invention are directed to a herbicidal microcapsule comprising a core material comprising an acetamide herbicide and a second herbicide, wherein at least a portion of the second herbicide is dissolved in the acetamide herbicide and wherein the weight ratio of the acetamide herbicide to the second herbicide in the core material is at least about 2:1; and a shell wall encapsulating the core material, wherein the shell wall comprises a polyurea.

Other aspects of the present invention are directed to aqueous herbicidal compositions comprising herbicidal microcapsules as described herein, which are dispersed in an aqueous liquid medium.

Further aspects of the present invention are directed to methods for controlling weeds in a field of a crop plant. The methods comprise applying to the field an application mixture comprising either (a) the herbicidal microcapsules as described herein or (b) the aqueous herbicidal composition as described herein or dilution thereof.

Still further aspects are directed to processes for preparing the herbicidal microcapsules. In general, the processes comprise mixing an acetamide herbicide and a second herbicide to form a mixture wherein at least a portion of the second herbicide dissolves in the acetamide herbicide; and encapsulating a core material comprising the mixture of the acetamide herbicide and the second herbicide in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium.

Certain aspects are directed to various methods for improving residual weed control. The method comprise applying to a field an application mixture comprising a salt of dicamba and herbicidal microcapsules comprising a core material and a shell wall encapsulating the core material, wherein the core material comprises an acetamide herbicide and a second herbicide comprising metribuzin and at least a portion of the metribuzin is dissolved in the acetamide herbicide, and wherein the shell wall comprises a polyurea.

Other objects and features will be in part apparent and in part pointed out hereinafter.

DETAILED DESCRIPTION OF THE INVENTION

Figure 1:
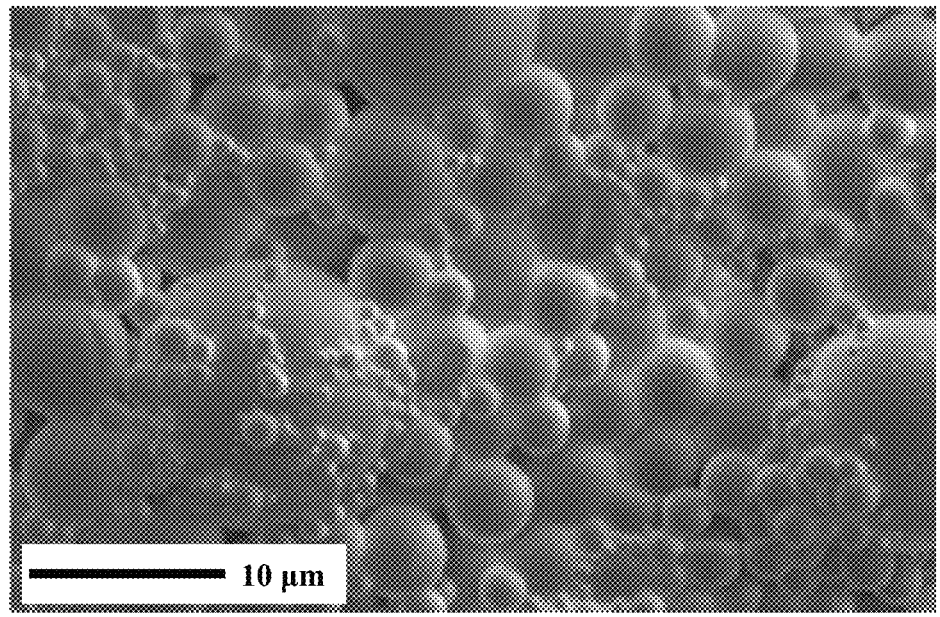
FIG. 1 shows a scanning electron microscopy image of microcapsules containing acetochlor and metribuzin.

Generally, the present invention relates to herbicidal microcapsules containing a combination of herbicides. The present invention also relates to processes for preparing these microcapsules. Further, the present invention relates to various herbicidal compositions containing these microcapsules and methods of preparing and using these herbicidal compositions.

Various aspects of the present invention provide for herbicidal microcapsules comprising a core material comprising a combination of an acetamide herbicide and a second herbicide. Herbicidal microcapsules containing a combination of herbicides are advantageous for providing herbicidal compositions having multiple modes of action. Encapsulation of a combination of herbicides can provide for improved crop safety as compared to mixtures of an encapsulated herbicide with one or more unencapsulated herbicides. Also encapsulation can provide an herbicide greater compatibility when package mixed or tank mixed because the encapsulated herbicides are not, at least initially, in significant contact with other formulation chemicals or herbicides. Consequently, incompatibility including degradation resulting from the presence of some other herbicides can be prevented or reduced.

Further aspects of the present invention provide for various herbicidal compositions comprising microencapsulated herbicides and methods of using these compositions to improve residual herbicide efficacy. Improving residual herbicide efficacy beneficially prolongs weed control and reduces the amount and number of herbicide applications needed for weed control.

Other aspects of the present invention provide for various herbicidal compositions comprising microencapsulated herbicides and methods of using these compositions for controlling weeds in a field of crop plants over a broader application window. Some herbicides may be too injurious to a crop plant if applied during certain timeframes. However, microencapsulation of the herbicides in accordance with the present invention can safen the herbicide such that the timeframe of application is expanded. Broadening the herbicide application window beneficially provides for greater flexibility in weed control.

Still further aspects of the invention provide for herbicidal compositions comprising microencapsulated herbicides and methods of using these compositions over a broader range of crop varieties. Some crop plants are sensitive to certain herbicides. Thus, application of these herbicides to the sensitive crop plant results in excessive injury or plant death. However, it has been discovered that microencapsulation of the herbicides can improve crop safety to a degree such that the herbicides may be applied over a broader spectrum of crop varieties under certain circumstances.

Other aspects of the invention provide for herbicidal compositions comprising microencapsulated herbicides and methods of using these compositions over a wider range of soil conditions. For example, some herbicides are labeled for use in select soils having a certain organic content and/or pH range. Microencapsulation of the herbicides has been found to improve crop safety to a degree such that the herbicides may be applied over a wider range of soil conditions.

I. Herbicidal Microcapsules

In general, the herbicidal microcapsules of the present invention comprise (a) a core material comprising an acetamide herbicide and a second herbicide and (b) a shell wall encapsulating the core material.

Core Material

As noted, the core material comprises an acetamide herbicide. Acetamide herbicides are a group of structurally related herbicides that include acetanilide herbicides (e.g., chloroacetanilide herbicides) and other amide-containing herbicides. Examples of acetamide herbicides suitable for microencapsulation include herbicides such as acetochlor, alachlor, butachlor, butenachlor, delachlor, dicthatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof. Some acetamide herbicides are available in their free forms, as salts, or as derivatized materials, for example, as esters. In further embodiments, the acetamide herbicide is selected from the group consisting of acetochlor, alachlor, metolachlor, S-metolachlor, dimethenamid, dimethenamid-P, butachlor, stereoisomers thereof, and mixtures thereof. In certain embodiments, the acetamide herbicide is selected from the group consisting of acetochlor, metolachlor S-metolachlor, and mixtures thereof. In some embodiments, the acetamide herbicide comprises acetochlor.

Chloroacetanilide herbicides are one subgroup of acetamide herbicides. In various embodiments, the acetamide herbicide comprises a chloroacetanilide herbicide. In these and other embodiments, the acetamide herbicide comprises at least one chloroacetanilide herbicide selected from the group consisting of acetochlor, alachlor, butachlor, butenachlor, delachlor, diethatyl, dimethachlor, metazochlor, metolachlor, S-metolachlor, pretilachlor, propachlor, propisochlor, prynachlor, terbuchlor, thenylchlor and xylachlor, stereoisomers thereof, and mixtures thereof. In some embodiments, the acetamide herbicide comprises at least one chloroacetanilide herbicide selected from the group consisting of the group consisting of acetochlor, alachlor, butachlor, metolachlor, S-metolachlor, stereoisomers thereof, and mixtures thereof.

As noted, it has been discovered that certain herbicides that can be at least partially dissolved in the acetamide herbicide are suitable for co-encapsulation with the acetamide herbicide. Accordingly, in various embodiments, at least a portion of the second herbicide is dissolved in the acetamide herbicide. For example, the second herbicide can be fully miscible in the acetamide herbicide or at least about 20 wt. %, at least about 30 wt. %, at least about 40 wt. %, at least about 50 wt. %, at least about 60 wt. %, at least about 70 wt. %, at least about 80 wt. %, at least about 90 wt. %, at least about 95 wt. % of the total amount of second herbicide can be dissolved in the acetamide herbicide. In some embodiments, from about 20 wt. % to about 99 wt. %, from about 30 wt. % to about 99 wt. %, from about 40 wt. % to about 99 wt. %, from about 50 wt. % to about 99 wt. %, from about 60 wt. % to about 99 wt. %, from about 70 wt. % to about 99 wt. %, from about 80 wt. % to about 99 wt. %, from about 90 wt. % to about 99 wt. %, from about 20 wt. % to about 95 wt. %, from about 30 wt. % to about 95 wt. %, from about 40 wt. % to about 95 wt. %, from about 50 wt. % to about 95 wt. %, from about 60 wt. % to about 95 wt. %, from about 70 wt. % to about 95 wt. %, from about 80 wt. % to about 95 wt. %, from about 90 wt. % to about 95 wt. %, from about 20 wt. % to about 90 wt. %, from about 30 wt. % to about 90 wt. %, from about 40 wt. % to about 90 wt. %, from about 50 wt. % to about 90 wt. %, from about 60 wt. % to about 90 wt. %, from about 70 wt. % to about 90 wt. %, or from about 80 wt. % to about 90 wt. % of the total amount of second herbicide is dissolved in the acetamide herbicide.

In general, herbicides that have limited water solubility are suitable for co-encapsulation. In various embodiments, the second herbicide has a water solubility no greater than 0.4 wt. %, no greater than about 0.2 wt. %, or no greater than about 0.1 wt. %. Also, herbicides that have a degree of organic solvent solubility are generally suitable for co-encapsulation. In various embodiments, the second herbicide has a solubility in an organic solvent that is at least about 1 wt. %, at least about 2 wt. %, or at least about 5 wt. %. Organic solvents include, for example, the acetamide herbicide, paraffinic hydrocarbon solvents include normal paraffin oil (e.g., NORPAR 15, available from ExxonMobil); isoparaffin oils (e.g., ISOPAR V, ISOPAR L, and ISOPAR M, also available from ExxonMobil); aliphatic fluids or oils (e.g., EXXSOL D110 and EXXSOL D130, available from ExxonMobil); aromatic hydrocarbon solvents such as those commonly known as Aromatic 200 (e.g., SOLVESSO 200 commercially available from ExxonMobil).

Herbicides from various classes are suitable for co-encapsulation. For example, various photosystem II (PS II) inhibitors, protoporphyrinogen oxidase (PPO) inhibitors, and hydroxyphenylpyruvate dioxygenase (HPPD) inhibitors can be co-encapsulated with the acetamide herbicide as the second herbicide.

In various embodiments, the second herbicide comprises a PS II inhibitor. For example, PS II inhibitors include ametryn, atrazine, bentazon, bromacil, bromoxynil, chlorotoluron, cyanazine, desmedipham, desmetryn, dimefuron, diuron, fluometuron, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine, trietazine, and mixtures thereof. Esters of these herbicides are also suitable provided the water solubility is less than 0.4 wt. %. In some embodiments, the second herbicide comprises a PS II inhibitor that is a triazine or triazinone compound.

One particularly suited PS II inhibitor for use in the present invention is metribuzin, which has been found to be sufficiently soluble in acetamide herbicides such as acetochlor. As noted, the release properties of microencapsulated acetamide herbicides can be highly sensitive to the inclusion of additives to the core material of the microcapsules. It has been surprisingly discovered that when metribuzin is co-encapsulated with an acetamide herbicide such as acetochlor, the release rates of both herbicides from the microcapsules are still controlled. Accordingly, in some embodiments, the acetamide herbicide comprises acetochlor and the second herbicide comprises metribuzin. In certain embodiments, the acetamide herbicide (e.g., comprising acetochlor) and the second herbicide (e.g., comprising metribuzin) are the only herbicides present in the core material or compose of at least about 80 wt. %, at least about 90 wt. %, or at least 95 wt. % of the herbicides present in the core material.

In further embodiments, the second herbicide comprises a hydroxyphenylpyruvate dioxygenase (HPPD) inhibitor. HPPD inhibitors include, for example, aclonifen, beflubutamid, benzofenap, clomazone, diflufenican, fluridone, flurochloridone, flurtamone, isoxachlortole, isoxaflutole, norflurazon, picolinafen, pyrazolynate, pyrazoxyfen, sulcotrione, tembotrione and topramezone, and mixtures thereof. Esters of these herbicides are also suitable provided the water solubility is less than 0.4 wt. %.

In other embodiments the second herbicide comprises at least one protoporphyrinogen oxidase (PPO) inhibitor. PPO inhibitors include, for example, acifluorfen, azafenidin, bifenox, butafenacil, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil, sulfentrazone, ethyl 2-((3-(2-chloro-4-fluoro-5-(3-methyl-2,6-dioxo-4-(trifluoromethyl)-3,6-dihydropyrimidin-1(2H)-yl)phenoxy)pyridin-2-yl)oxy) acetate, and mixtures thereof. Esters of these herbicides are also suitable provided the water solubility is less than 0.4 wt. %.

Other second herbicides suitable for co-encapsulation include ALS inhibitors such as primisulfuron, imazosufuron, foramsulfuron, imazethapyr, and halosufluron; ACCase inhibitors such as quizalofop-P and fluazifop-P; mitosis inhibitors such as ethalfuralin, napropamide, S-metolachlor, pronamide, alachlor, dimethenamid-p, bensulide, pendimethalin, oryzalin, trifluralin, and pyroxasulfone; lipid biosynthesis inhibitor such as EPTC, ethofumesate, and cycloate; auxins such as 2,4-dichlorophenoxyacetic acid, triclopyr, quinclorac, fluroxypyr, clopyralid; and pigment synthesis inhibitors such as norflurazon. Esters of these herbicides are also suitable provided the water solubility is less than 0.4 wt. %

Typically, the acetamide herbicide is in excess of the second herbicide. Accordingly, the weight ratio of the acetamide herbicide to the second herbicide in the core material is at least about 2:1, at least about 3:1, at least about 4:1, at least about 5:1, at least about 9:1, at least about 10:1, at least about 25:1, at least about 50:1, at least about 100:1, or at least about 200:1. In various embodiments, the weight ratio of the acetamide herbicide to the second herbicide in the core material is from about 2:1 to about 300:1, from about 2:1 to about 200:1, from about 2:1 to about 100:1, from about 2:1 to about 50:1, from about 2:1 to about 25:1, from about 2:1 to about 10:1, from about 2:1 to about 9:1, from about 2:1 to about 5:1, from about 2:1 to about 4:1, from about 2:1 to about 3:1, from about 3:1 to about 300:1, from about 3:1 to about 200:1, from about 3:1 to about 100:1, from about 3:1 to about 50:1, from about 3:1 to about 25:1, from about 3:1 to about 10:1, from about 3:1 to about 9:1, from about 3:1 to about 5:1, from about 3:1 to about 4:1, from about 4:1 to about 300:1, from about 4:1 to about 200:1, from about 4:1 to about 100:1, from about 4:1 to about 50:1, from about 4:1 to about 25:1, from about 4:1 to about 10:1, from about 4:1 to about 9:1, or from about 4:1 to about 5:1.

As noted, in various embodiments, metribuzin is the second herbicide. In some of these embodiments, the weight ratio of the acetamide herbicide (e.g., acetochlor) to metribuzin in the core material is from about 2:1 to about 10:1, from about 3:1 to about 10:1, from about 4:1 to about 10:1, from about 2:1 to about 8:1, from about 3:1 to about 8:1, from about 4:1 to about 10:1, from about 2:1 to about 5:1, from about 3:1 to about 5:1, or from about 4:1 to about 5:1. In certain embodiments, the weight ratio of the acetamide herbicide (e.g., acetochlor) to metribuzin in the core material is such that the amount of metribuzin is less than the solubility limit of metribuzin in the acetamide herbicide at 25° C. (e.g., from about 5% to about 20%, from about 5% to about 15%, or from about 10% to about 15% less than the solubility limit).

Typically the acetamide herbicide constitutes a large percentage of the microcapsule weight. For instance, the acetamide herbicide can constitute at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % of the microcapsule. In various embodiments, the acetamide herbicide constitutes from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. % of the microcapsule.

The core material can further comprise one or more additives including a safener or diluent (e.g., additional solvent). In some embodiments, the core material comprises a safener. Safeners include, for example, furilazole ((RS)-3-(dichloroacetyl)-5-(2-furanyl)-2,2-dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy)acetic acid); cyometrinil ((Z)-cyanomethoxyimino(phenyl)acetonitrile); cyprosulfamide (N-[4-(cyclopropylcarbamoyl)phenylsulfonyl]-o-anisamide); dichlormid (N,N-diallyl-2,2-dichloroacetamide); dicyclonon ((RS)-1-dichloroacetyl-3,3,8a-trimethylperhydropyrrolo[1,2-a]pyrimidin-6-one); diethalate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino(phenyl)acetonitrile); isoxadifen (4,5-dihydro-5,5-diphenyl-1,2-oxazole-3-carboxylic acid); cyprosulfamide; salts and esters thereof, and mixtures thereof.

The core material may also further comprise a diluent. A diluent, such as a solvent, may be added to change the solubility parameter characteristics of the core material to increase or decrease the release rate of the herbicides from the microcapsule once release has been initiated. In some embodiments, the diluent is a water-insoluble organic solvent having a solubility of less than 10, 5, 1, 0.5 or even 0.1 gram per liter at 25° C.

Exemplary diluents include, for example: alkyl-substituted biphenyl compounds (e.g., SureSol 370, commercially available from Koch Co.); normal paraffin oil (e.g., NORPAR 15, commercially available from Exxon); mineral oil (e.g., ORCHEX 629, commercially available from Exxon); isoparaffin oils (e.g., ISOPAR V and ISOPAR L, commercially available from Exxon); aliphatic fluids or oils (e.g., EXXSOL D110 and EXXSOL D130, commercially available from Exxon); alkyl acetates (e.g., EXXATE 1000, formerly commercially available from Exxon); aromatic fluids or oils (A 200, commercially available from Exxon); citrate esters (e.g., Citroflex A4, commercially available from Morflex); and, plasticizing fluids or oils used in, for examples, plastics (typically high boiling point esters). In some embodiments, the diluent comprises a paraffinic hydrocarbon solvent, preferably containing predominantly a linear or branched hydrocarbon such as pentadecane, ISOPAR V, and ISOPAR M.

The core material may comprise from 0% to about 35 wt. % of a diluent, for example from 0.1 wt. % to about 25 wt. %, from about 0.5 wt. % and about 20 wt. %, or from about 1 wt. % and 10 wt. %. In particular, the core material may comprise 0 wt. %, 0.5 wt. % 1 wt. %, 2 wt. %, 3 wt. %, 4 wt. %, 5 wt. %, 6 wt. %, 7 wt. %, 8 wt. %, 10 wt. %, 15 wt. %, 20 wt. %, 25 wt. %, 30 wt. %, or 35 wt. % diluent or any range composed of these weight percentages such as from 0% to 35 wt. %, from 1 wt. % to 30 wt. %, and so on. The weight ratio of total herbicide (acetamide herbicide and second herbicide) to diluent can be, for example, from about 2:1 to about 100:1, from about 5:1 to about 100:1, from about 10:1 to about 100:1, from about 15:1 to about 100:1, from about 2:1 to about 50:1, from about 5:1 to about 50:1, from about 10:1 to about 50:1, from about 15:1 to about 50:1, from about 2:1 to about 25:1, from about 5:1 to about 25:1, from about 10:1 to about 25:1, from about 15:1 to about 25:1, or from about 15:1 to about 20:1.

Shell Wall and Formation of Microcapsules

As noted, the herbicidal microcapsules of the present invention comprise a core material comprising an acetamide herbicide and a second herbicide and a shell wall containing the core material. In general, the shell wall comprises a polyurea.

The process of microencapsulation can be conducted according to interfacial polycondensation techniques. Microencapsulation of water-immiscible materials utilizing an interfacial polycondensation reaction generally involves dissolving a first reactive monomeric or polymeric material(s) (first shell wall component) in the material to be encapsulated (i.e., core material) to form an oil or discontinuous phase liquid. The discontinuous phase liquid is then dispersed into an aqueous or continuous phase liquid to form an oil-in-water emulsion. The continuous phase (aqueous)

liquid may contain a second reactive monomeric or polymeric material (second shell wall component) at the time the discontinuous phase is dispersed into the continuous phase. If this is the case, the first and second shell wall components will immediately begin to react at the oil-in-water interface to form a polycondensate shell wall around the material(s) to be encapsulated. However, the oil-in-water emulsion can also be formed before the second shell wall component is added to the emulsion.

The oil-in-water emulsion that is formed during the interfacial polymerization reaction can be prepared by adding the oil phase to the continuous aqueous phase to which an emulsifying agent has been added (e.g., previously dissolved therein). The emulsifying agent is selected to achieve the desired oil droplet size in the emulsion. The size of the oil droplets in the emulsion is impacted by a number of factors in addition to the emulsifying agent employed and determines the size of microcapsules formed by the process. The emulsifying agent is preferably a protective colloid. Polymeric dispersants are preferred as protective colloids. Polymeric dispersants provide steric stabilization to an emulsion by adsorbing to the surface of an oil drop and forming a high viscosity layer which prevents drops from coalescing. Polymeric dispersants may be surfactants and are preferred to surfactants which are not polymeric, because polymeric compounds form a stronger interfacial film around the oil drops. If the protective colloid is ionic, the layer formed around each oil drop will also serve to electrostatically prevent drops from coalescing.

SOKALAN (available from BASF), a maleic acid-olefin copolymer, is a preferred protective colloid, as is INVALON (available from Huntsman) and AGNIQUE NSC 11NP (available from BASF), which are naphthalene sulfonate condensates. Other protective colloids useful in this invention are gelatin, casein, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, sodium and calcium lignosulfonates, sulfonated naphthalene-formaldehyde condensates, modified starches, and modified cellulosics like hydroxyethyl or hydroxypropyl cellulose, and carboxymethyl cellulose.

In general, the polyurea shell wall of the microcapsules of the present inventions is formed in a polymerization medium by a polymerization reaction between a polyisocyanate component comprising a polyisocyanate or mixture of polyisocyanates and a polyamine component comprising a polyamine or mixture of polyamines to form the polyurea. See, for example, U.S. Pat. No. 5,925,595; U.S. Publication No. 2004/0137031; and U.S. Publication No. 2010/0248963, which are incorporated herein by reference.

The herbicides encapsulated with a polyurea shell wall for use in the present invention can be prepared by contacting an aqueous continuous phase containing a polyamine component comprising a polyamine source and a discontinuous oil phase containing the acetamide herbicide, the second herbicide and a polyisocyanate component comprising a polyisocyanate source. A polyurea shell wall is formed in a polymerization reaction between the polyamine source and the polyisocyanate source at the oil/water interface thereby forming microcapsules containing the herbicides. Accordingly, processes for preparing herbicidal microcapsules generally comprises mixing the acetamide herbicide and second herbicide to form a mixture wherein at least a portion of the second herbicide dissolves in the acetamide herbicide; and encapsulating a core material comprising the mixture of the acetamide herbicide and second herbicide in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium.

As noted herein, the herbicide actives must be compatible with both the microencapsulation process as well as the shell wall material. To compatible with the microencapsulation process, the core material must be sufficiently water-immiscible such that the material remains in the discontinuous (oil) phase liquid. Water-immiscibility refers to materials that have a relatively low water solubility at about 25° C., for example, less than about 500 mg/L, preferably less than about 250 mg/L, even more preferably less than about 100 mg/L. Certain core materials have even lower water solubility, such as acetochlor, which is less than 25 mg/L at 25° C. Also noted herein, it has been discovered that metribuzin, a preferred second herbicide, can be dissolved in acetamide herbicides such as acetochlor. Even though the water solubility of metribuzin is approximately 1100 mg/L at 20° C., the herbicide remains in the discontinuous phase liquid when dissolved in the acetamide herbicide.

Although the herbicides to be encapsulated may be compatible with the microencapsulation process, this does not mean that the herbicides are necessarily compatible with the shell wall material. It has been observed that some herbicides react with the shell wall after encapsulation causing defects and cracks in the shell wall, which results in uncontrolled herbicide release from the microcapsules. In accordance with various aspects of the invention, it has been further discovered that metribuzin along with the acetamide herbicides are compatible with the shell wall material. When metribuzin is co-encapsulated with an acetamide herbicide such as acetochlor, the release rates of both herbicides from the microcapsules are still controlled.

Thus, various processes of the present invention are directed to preparing herbicidal microcapsules in which acetochlor is the acetamide herbicide and metribuzin is the second herbicide. In general, these process comprise mixing acetochlor and metribuzin to form a mixture wherein at least a portion of the metribuzin dissolves in the acetochlor; and encapsulating a core material comprising the mixture of metribuzin and acetochlor in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium. In some of these processes, the weight ratio of acetochlor to metribuzin is from about 2:1 to about 10:1, from about 3:1 to about 10:1, from about 4:1 to about 10:1, from about 2:1 to about 8:1, from about 3:1 to about 8:1, from about 4:1 to about 10:1, from about 2:1 to about 5:1, from about 3:1 to about 5:1, or from about 4:1 to about 5:1. In certain embodiments, the weight ratio of acetochlor to metribuzin is such that the amount of metribuzin is less than the solubility limit of metribuzin in the acetochlor herbicide at 25° C. (e.g., from about 5% to about 20%, from about 5% to about 15%, or from about 10% to about 15% less than the solubility limit).

In general, the polyurea polymer may be formed using one or more polyisocyanates, i.e., having two or more isocyanate groups per molecule. A wide variety of polyisocyanates can be employed. For example, the polyisocyanate component can comprise an aliphatic polyisocyanate (e.g., DESMODUR W, DESMODUR N 3200 and DESMODUR N 3215). In some embodiments, the polyurea shell wall is formed using a blend of at least two polyisocyanates. For example, the polyurea shell wall is formed in an interfacial polymerization reaction using at least one diisocyanate and at least one triisocyanate (e.g., a combination of DESMODUR W and DESMODUR N 3200 or N 3215). In certain embodiments, the polyisocyanate component comprises a polyisocyanate based on hexamethylene-1,6-diisocyanate (e.g., DESMODUR N 3200 or N 3215).

Also, the polyamine source can be a single polyamine species or a mixture of two or more different polyamine species. In various embodiments, the polyamine component comprising a polyamine of the structure $NH_2(CH_2CH_2NH)_mCH_2CH_2NH_2$ where m is from 1 to 5, 1 to 3, or 2. Specific examples of polyamines include substituted or unsubstituted polyethyleneamine, polypropyleneamine, diethylene triamine and triethylenetetramine (TETA). One preferred polyamine is TETA.

It is typically advantageous to select a polyamine component and a polyisocyanate component such that the polyamine has an amine functionality of at least 2, i.e., 3, 4, 5 or more, and at least one of the polyisocyanates has an isocyanate functionality of at least 2, i.e., 2.5, 3, 4, 5, or more since high amine and isocyanate functionality increases the percentage of cross-linking occurring between individual polyurea polymers that comprise the shell wall.

In various embodiments, the polyamine has an amine functionality of greater than 2 and the polyisocyanate is a mixture of polyisocyanates wherein each polyisocyanate has an isocyanate functionality of greater than 2. In other embodiments, the polyamine comprises a trifunctional polyamine and the polyisocyanate component comprises one or more trifunctional polyisocyanates. In yet other embodiments, the shell wall is formed by the reaction between a polyisocyanate or mixture of polyisocyanates with a minimum average of 2.5 reactive groups per molecule and a polyamine with an average of at least three reactive groups per molecule.

Generally, a sufficient amount of polyamine component is provided to the reaction medium such that the polyisocyanate is completely reacted. Complete reaction of the polyisocyanate component increases the percentage of cross-linking between polyurea polymers formed in the reaction thereby providing structural stability to the shell wall. In various embodiments, an equimolar or excess of amine groups to isocyanate groups is supplied to the reaction medium. That is, the molar equivalents ratio of amine equivalents to isocyanate equivalents used in preparation of the shell wall of the microcapsules is typically 1:1 or greater (e.g., at least about 1.01:1, at least about 1.05:1, at least about 1.1:1, at least about 1.15:1, or at least about 1.2:1). However, in some instances, the reaction medium can contain one or more other ingredients besides the polyamine component that can react with the polyisocyanate component. In these instances, the molar equivalents ratio of amine equivalents to isocyanate equivalents can be slightly less than 1:1, such as at least about 0.9:1 or at least about 0.95:1. Accordingly, the ratio of amine molar equivalents contained in the polyamine component to isocyanate molar equivalents contained in the polyisocyanate component can be from about 0.9:1 to about 1.7:1, from about 0.9:1 to about 1.6:1, from about 0.9:1 to about 1.5:1, from about 0.9:1 to about 1.4:1, from about 0.9:1 to about 1.3:1, from about 0.9:1 to about 1.2:1, from about 0.9:1 to about 1.1:1, from about 0.95:1 to about 1.7:1, from about 0.95:1 to about 1.6:1, from about 0.95:1 to about 1.5:1, from about 0.95:1 to about 1.4:1, from about 0.95:1 to about 1.3:1, from about 0.95:1 to about 1.2:1, from about 0.95:1 to about 1.1:1, from about 1:1 to about 1.7:1, from about 1:1 to about 1.6:1, from about 1:1 to about 1.5:1, from about 1:1 to about 1.4:1, from about 1:1 to about 1.3:1, from about 1.01:1 to about 1.7:1, from about 1.01:1 to about 1.6:1, from about 1.01:1 to about 1.5:1, from about 1.01:1 to about 1.4:1, from about 1.01:1 to about 1.3:1, from about 1.05:1 to about 1.7:1, from about 1.05:1 to about 1.6:1, from about 1.05:1 to about 1.5:1, from about 1.05:1 to about 1.4:1, from about 1.05:1 to about 1.3:1, from 1.1:1 to about 1.7:1, from 1.1:1 to about 1.6:1, from 1.1:1 to about 1.5:1, from 1.1:1 to about 1.4:1, from 1.1:1 to about 1.3:1, from about 1.15:1 to about 1.7:1, from about 1.15:1 to about 1.6:1, from about 1.15:1 to about 1.5:1, from about 1.15:1 to about 1.4:1, from about 1.15:1 to about 1.3:1, from 1.2:1 to about 1.7:1, from 1.2:1 to about 1.6:1, from 1.2:1 to about 1.5:1, from 1.2:1 to about 1.4:1, or from 1.2:1 to about 1.3:1.

The molar equivalents ratio of amine molar equivalents to isocyanate molar equivalents is calculated according to the following equation:

$$\text{Molar Equivalents Ratio} = \frac{\text{amine molar equivalents}}{\text{isocyanate molar equivalents}} \quad (1)$$

In the above equation (1), the amine molar equivalents is calculated according to the following equation:

molar equivalents=Σ(polyamine weight/equivalent weight).

In the above equation (1), the isocyanate molar equivalents is calculated according to the following equation:

isocyanate molar equivalents=Σ(polyisocyanate weight/equivalent weight).

The equivalent weight is generally calculated by dividing the molecular weight in grams/mole by the number of functional groups per molecules and is in grams/mole. For some molecules, such as triethylenetetramine ("TETA") and 4,4'-diisocyanato-dicyclohexyl methane ("DES W"), the equivalent weight is equal to the molecular weight divided by the number of functional groups per molecule. For example, TETA has a molecular weight of 146.23 g/mole and 4 amine groups. Therefore, the equivalent weight is 36.6 g/mol. This calculation is generally correct, but for some materials, the actual equivalent weight may vary from the calculated equivalent weight. In some components, for example, the biuret-containing adduct (i.e., trimer) of hexamethylene-1,6-diisocyanate, the equivalent weight of the commercially available material differs from the theoretical equivalent weight due to, for example, incomplete reaction. The theoretical equivalent weight of the biuret-containing adduct (i.e., trimer) of hexamethylene-1,6-diisocyanate is 159.5 g/mol. The actual equivalent weight of the trimer of hexamethylene-1,6-diisocyanate ("DES N3200"), the commercially available product, is about 183 g/mol. This actual equivalent weight is used in the calculations above. The actual equivalent weight may be obtained from the manufacturer or by titration with a suitable reactant by methods known in the art. The symbol, Σ, in the amine molar equivalents calculation means that the amine molar equivalents comprises the sum of amine molar equivalents for all polyamines in the reaction medium. Likewise, the symbol, Σ, in the isocyanate molar equivalents calculation means that the isocyanate molar equivalents comprises the sum of isocyanate molar equivalents for all polyisocyanates in the reaction medium.

Generally, the microcapsules prepared according to the processes described herein can be characterized as having a mean particle size of at least about 2 µm, at least about 3 µm, or at least about 4 µm. For example, the microcapsules have a mean particle size range of from about 2 µm to about 15

μm, from about 2 μm to about 12 μm, from about 2 μm to about 10 μm, from about 2 μm to about 8 μm, from about 3 μm to about 15 μm, from about 3 μm to about 10 μm, from about 3 μm to about 8 μm, from about 4 μm to about 15 μm, from about 4 μm to about 12 μm, from about 4 μm to about 10 μm, from about 4 μm to about 8 μm, or from about 4 μm to about 7 μm. The microcapsules are essentially spherical such that the mean transverse dimension defined by any point on a surface of the microcapsule to a point on the opposite side of the microcapsule is essentially the diameter of the microcapsule. The mean particle size of the microcapsules can be determined by measuring the particle size of a representative sample with a laser light scattering particle size analyzer known to those skilled in the art. One example of a particle size analyzer is a Coulter LS Particle Size Analyzer.

The weight ratio of core material components to shell wall components can be adjusted to further affect the release rate profile of the herbicidal microcapsules. For example, increasing the amount of shell wall relative to the amount of core material can provide for a thicker shell and reduce the herbicide release rate. In various embodiments, the weight ratio of core material to the shell wall can range from about 3:1 to about 20:1, from about 5:1 to about 20:1, from about 8:1 to about 20:1, from about 10:1 to about 20:1, from about 3:1 to about 16:1, from about 5:1 to about 16:1, from about 8:1 to about 16:1, from about 10:1 to about 16:1, from about 3:1 to about 12:1, from about 5:1 to about 12:1, from about 8:1 to about 12:1 or from about 10:1 to about 12:1.

II. Herbicidal Compositions

The present invention is further directed to various herbicidal compositions comprising the herbicidal microcapsules described herein. Generally, the herbicidal microcapsules will be dispersed in a liquid medium, preferably aqueous liquid medium (e.g., water), after preparation to form liquid herbicidal compositions. The herbicide loading in the liquid herbicidal compositions range depending on the form of the compositions (i.e., concentrate or dilute application mixture). Generally, the total herbicide loading in the liquid herbicidal compositions ranges from about 1% to about 60% or from about 1% to about 50% by weight on an active ingredient basis, such as 5%, 10%, 15%, 20%, 25%, 30%, 35%, 40%, 45%, 50%, 60%, or ranges between these percentages, by weight on an active ingredient basis.

In various embodiments, the liquid herbicidal composition is an aqueous herbicidal concentrate composition that contains at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % of the microencapsulated herbicides (acetamide herbicide and second herbicide) on an active ingredient basis. In these and other embodiments, the aqueous herbicidal concentrate composition contains from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. % of the microencapsulated herbicides on an active ingredient basis.

In various aqueous herbicidal concentrate compositions, the acetamide herbicide constitutes a substantial portion of the compositions. Accordingly, in some embodiments, the total acetamide concentration of the composition is at least about 15 wt. %, at least about 20 wt. %, at least about 25 wt. %, at least about 30 wt. %, or at least about 35 wt. %. In certain embodiments, the total acetamide concentration of the composition is from about 15 wt. % to about 40 wt. %, from about 20 wt. % to about 40 wt. %, from about 20 wt. % to about 35 wt. %, from about 20 wt. % to about 30 wt. %, from about 25 wt. % to about 40 wt. %, from about 25 wt. % to about 35 wt. %, from about 30 wt. % to about 40 wt. %, or from about 30 wt. % to about 35 wt. %.

In various aqueous herbicidal concentrate compositions, the total second herbicide concentration is from about 1 wt. % to about 20 wt. %, from about 2 wt. % to about 20 wt. %, from about 5 wt. % to about 20 wt. %, from about 1 wt. % to about 15 wt. %, from about 2 wt. % to about 15 wt. %, from about 5 wt. % to about 15 wt. %, from about 1 wt. % to about 10 wt. %, from about 2 wt. % to about 10 wt. %, or from about 5 wt. % to about 10 wt. %.

In other embodiments, the liquid herbicidal compositions are application mixtures. The total herbicide loading in the application mixture is typically no more than about 5% by weight or from about 0.1% to about 5% by weight on an active ingredient basis, such as 5%, 4%, 3%, 2%, 1%, 0.5% or 0.1% by weight on an active ingredient basis.

Additional Herbicide Ingredients

The liquid herbicidal compositions of the present invention can further comprise an additional herbicide (i.e., in addition to the co-encapsulated acetamide herbicide and second herbicide). Generally, the additional herbicide is added to the liquid medium comprising the herbicidal microcapsules dispersed therein.

In various embodiments, the weight ratio of total microencapsulated herbicide (i.e., acetamide herbicide and second herbicide) to additional herbicide can be from about 1:30 to about 30:1, from about 1:20 to about 20:1, from about 1:10 to about 10:1, from about 1:8 to about 8:1, from about 1:5 to about 5:1, from about 1:1 to about 30:1, from about 1:1 to about 20:1, from about 1:1 to about 10:1, from about 1:1 to about 8:1, from about 1:1 to about 5:1, from about 1:1 to about 3:1, from about 2:1 to about 30:1, from about 2:1 to about 20:1, from about 2:1 to about 10:1, from about 2:1 to about 8:1, from about 2:1 to about 5:1, from about 2:1 to about 3:1, from about 1:1.5 to about 30:1, from about 1:1.5 to about 20:1, from about 1:1.5 to about 15:1, from about 1:1.5 to about 10:1, from about 1:1.5 to about 8:1, from about 1:1.5 to about 5:1, or from about 1:1.5 to about 3:1.

Additional herbicides can be water-soluble and are typically be selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO)

inhibitors, hydroxyphenylpyruvate dioxygenase (HPPD) inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof. Examples of herbicides within these classes are provided below. Where an herbicide is referenced generically herein by name, unless otherwise restricted, that herbicide includes all commercially available forms known in the art such as salts, esters, free acids and free bases, as well as stereoisomers thereof. For example, where the herbicide name "glyphosate" is used, glyphosate acid, salts and esters are within the scope thereof.

In various embodiments, the additional herbicide comprises an EPSPS herbicide such as glyphosate or a salt or ester thereof.

In further embodiments, the additional herbicide comprises a glutamine synthetase herbicide including glufosinate or glufosinate-P, or a salt or and ester thereof.

In some embodiments, the additional herbicide comprises an auxin herbicide. Auxin herbicides (i.e., synthetic auxin herbicides) include, for example, 2,4-dichlorophenoxyacetic acid (2,4-D), 4-(2,4-dichlorophenoxy)butyric acid (2,4-DB), dichloroprop, 2-methyl-4-chlorophenoxyacetic acid (MCPA), 4-(4-chloro-2-methylphenoxy)butanoic acid (MCPB), aminopyralid, clopyralid, fluroxypyr, triclopyr, diclopyr, mecoprop, dicamba, picloram and quinclorac, salts and esters thereof, and mixtures thereof.

In still further embodiments, the additional herbicide comprises a PPO inhibitor. PPO inhibitors include, for example, acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof. In particular embodiments, the additional herbicide comprises fomesafen and/or a salt of fomesafen such as sodium fomesafen.

In various embodiments, the additional herbicide comprises a HPPD inhibitor. HPPD inhibitors include, for example, aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione and topramezone, salts and esters thereof, and mixtures thereof.

In other embodiments, the additional herbicide comprises a PS II inhibitor. PS II inhibitors include, for example, ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

In certain embodiments, the additional herbicide comprises an ACCase inhibitor. ACCase inhibitors include, for example, alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof. ACCase inhibitors also include mixtures of one or more "dims" and one or more "fops", salts and esters thereof.

In various embodiments, the additional herbicide comprises an ALS or AHAS inhibitor. ALS and AHAS inhibitors include, for example, amidosulfuron, azimsulfruon, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuron-methyl, salts and esters thereof, and mixtures thereof.

In further embodiments, the additional herbicide comprises a mitosis inhibitor. Mitosis inhibitors include anilofos, benefin, DCPA, dithiopyr, ethalfluralin, flufenacet, mefenacet, oryzalin, pendimethalin, thiazopyr and trifluralin, salts and esters thereof, and mixtures thereof.

In some embodiments, the additional herbicide comprises a PS I inhibitor such as diquat and paraquat, salts and esters thereof, and mixtures thereof.

In other embodiments, the additional herbicide comprises a cellulose inhibitor such as dichlobenil and isoxaben.

In still further embodiments, the additional herbicide comprises an oxidative phosphorylation uncoupler such as dinoterb, and esters thereof.

In other embodiments, the additional herbicide comprises an auxin transport inhibitor such as diflufenzopyr and naptalam, salts and esters thereof, and mixtures thereof.

In various embodiments, the additional herbicide comprises a dihydropteroate synthase inhibitor such as asulam and salts thereof.

In some embodiments, the additional herbicide comprises a fatty acid and lipid biosynthesis inhibitor such as bensulide, butylate, cycloate, EPTC, esprocarb, molinate, pebulate, prosulfocarb, thiobencarb, triallate and vernolate, salts and esters thereof, and mixtures thereof.

Some preferred additional herbicides flumioxazin, fluometuron, diuron, sulfentrazone, fomesafen, saflufenacil, thiencarbazone, mesotrione, atrazine, isoxaflutole, 2,4-D, dicamba and glyphosate, salts and esters thereof, racemic mixtures and resolved isomers thereof, and mixtures thereof.

The additional herbicide can include a combination of herbicides described above. For example, one combination of additional herbicides is a salt of dicamba and a salt of glyphosate.

In certain embodiments, the additional herbicide comprises a salt of 2,4-D (e.g., an alkali metal salt or amine-based salt such as dimethylamine). In various embodiments, the additional herbicide comprises a salt of dicamba. Specific examples of salts of dicamba include the sodium salt of dicamba, the potassium salt of dicamba, the monoethanolamine salt of dicamba, the diglycolamine salt of dicamba, the dimethylamine salt of dicamba and combinations thereof.

Other agronomically acceptable salts of auxin herbicides such as 2,4-D and dicamba include polyamine salts such as those described in U.S. Patent Application Publication No. 2012/0184434, which is incorporated herein by reference. The polyamines described in U.S. 2012/0184434 include those of formula (A)

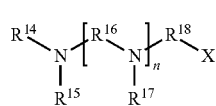
(A)

wherein $R^{14}$, $R^{15}$, $R^{17}$, $R^{19}$ and $R^{20}$ are independently H or $C_1$-$C_6$-alkyl, which is optionally substituted with OH, $R^{16}$ and $R^{18}$ are independently $C_2$-$C_4$-alkylene, X is OH or $NR^{19}R^{20}$, and n is from 1 to 20; and those of formula (B)

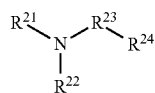
(B)

wherein $R^{21}$ and $R^{22}$ are independently H or $C_1$-$C_6$-alkyl, $R^{23}$ is $C_1$-$C_{12}$-alkylene, and $R^{24}$ is an aliphatic $C_5$-$C_8$ ring system, which comprises either nitrogen in the ring or which is substituted with at least one unit $NR^{21}R^{22}$. Specific examples of these polyamines include tetraethylenepentamine, triethylenetetramine, diethylenetriamine, pentamethyldiethylenetriamine, N,N,N',N'',N''-pentamethyl-dipropylenetriamine, N,N-bis(3-dimethylaminopropyl)-N-isopropanolamine, N'-(3-(dimethylamino)propyl)-N,N-dimethyl-1,3-propanediamine, N,N-bis(3-aminopropyl) methylamine, N-(3-dimethylaminopropyl)-N,N-diisopropanolamine, N,N,N'-trimethylaminoethyl-ethanolamine, aminopropylmonomethylethanolamine, and aminoethylethanolamine, and mixtures thereof.

One preferred aqueous herbicidal composition comprises herbicidal microcapsules as described herein dispersed in an aqueous liquid medium. The herbicidal microcapsules comprise a core material comprising acetochlor as the acetamide herbicide and metribuzin as the second herbicide and a shell wall encapsulating the core material, wherein the shell wall comprises a polyurea. The aqueous liquid medium of this composition also comprises a salt of dicamba as the additional herbicide.

Release Modulating Agent

The liquid herbicidal compositions of the present invention can also further comprise a release modulating agent that modulates the release rate of the microencapsulated herbicide. Release modulating agents are described in U.S. Patent Application Publication No. 2016/0192645, which is hereby incorporated by reference herein. In various embodiments, the release modulating agent comprises a polyvalent metal cation. The release modulating agent can be added to a liquid herbicidal composition as a water soluble salt or salt solution (e.g., added to the liquid medium, but not the core material of the microcapsules). In some embodiments, the release modulating agent comprises a polyvalent metal cation. The polyvalent ions can be ions of metals selected the group consisting of magnesium, calcium, aluminum, manganese, iron, copper, zinc, and combinations thereof. In certain embodiments, the polyvalent metal cation comprises $Ca^{2+}$.

The molecular weight of the release modulating agent can be relatively small being no greater than about 1000 g/mol, no greater than about 750 g/mol, no greater than about 500 g/mol, no greater than about 300 g/mol, or no greater than about 200 g/mol. For example, the molecular weight of the release modulating agent can be from about 50 g/mol to about 1000 g/mol, from about 50 g/mol to about 750 g/mol, from about 50 g/mol to about 500 g/mol, from about 50 g/mol to about 300 g/mol, from about 50 g/mol to about 200 g/mol, from about 100 g/mol to about 1000 g/mol, from about 100 g/mol to about 750 g/mol, from about 100 g/mol to about 500 g/mol, from about 100 g/mol to about 300 g/mol, or from about 100 g/mol to about 200 g/mol.

The release modulating agent can also comprise an organic anion. For example, the release modulating agent can comprise an anion selected from the group consisting of acetate, citrate, carbonate, oxalate and combinations thereof (e.g., calcium acetate). Alternatively, the release modulating agent can comprise an inorganic anion. For example, the release modulating agent can be a salt of a mineral acid such as a halide of salt (e.g., calcium chloride). Also, the release modulating agent can comprise a sulfate anion (e.g., copper sulfate). A mixture of salts can be added to the liquid herbicidal compositions as the release modulating agent. For example, the release modulating agent can comprise a combination of a calcium salt such as calcium chloride or calcium acetate and a copper salt such as copper sulfate.

The ratio of moles of polyvalent metal cation to amine molar equivalents contained in the polyamine component used to form the polyurea shell wall can be from about 0.05:1 to about 10:1, from about 0.05:1 to about 5:1, from about 0.05:1 to about 3:1, from about 0.05:1 to about 2:1, from about 0.05:1 to about 1.75:1, from about 0.05:1 to about 1.5:1, from about 0.05:1 to about 1:1, from about 0.1:1 to about 10:1, from about 0.1:1 to about 5:1, from about 0.1:1 to about 3:1, from about 0.1:1 to about 2:1, from about 0.1:1 to about 1.75:1, from about 0.1:1 to about 1.5:1, from about 0.1:1 to about 1:1, from about 0.2:1 to about 10:1, from about 0.2:1 to about 5:1, from about 0.2:1 to about 3:1, from about 0.2:1 to about 2:1, from about 0.2:1 to about 1.75:1, from about 0.2:1 to about 1.5:1, from about 0.2:1 to about 1:1, from about 0.3:1 to about 10:1, from about 0.3:1 to about 5:1, from about 0.3:1 to about 3:1, from about 0.3:1 to about 2:1, from about 0.3:1 to about 1.75:1, from about 0.3:1 to about 1.5:1, from about 0.3:1 to about 1:1, from about 0.4:1 to about 10:1, from about 0.4:1 to about 5:1, from about 0.4:1 to about 3:1, from about 0.4:1 to about 2:1, from about 0.4:1 to about 1.75:1, from about 0.4:1 to about 1.5:1, from about 0.4:1 to about 1:1, from about 0.5:1 to about 10:1, from about 0.5:1 to about 5:1, from about 0.5:1 to about 3:1, from about 0.5:1 to about 2:1, from about 0.5:1 to about 1.75:1, from about 0.5:1 to about 1.5:1, or from about 0.5:1 to about 1:1.

In various embodiments, the mole ratio of acetamide herbicide to polyvalent metal cation can be from 1:1 to about 100:1, from about 2:1 to about 100:1, from about 2:1 to about 80:1, from about 3:1 to about 80:1, from about 3:1 to about 60:1, from about 3:1 to about 40:1, from about 4:1 to about 100:1, from about 4:1 to about 80:1, from about 4:1 to about 60:1, from about 4:1 to about 40:1, from about 4:1 to about 25:1, from about 5:1 to about 100:1, from about 5:1 to about 80:1, from about 5:1 to about 60:1, from about 5:1 to about 40:1, or from about 5:1 to about 25:1.

In various embodiments where the liquid herbicidal composition is a concentrate composition, the concentration of the release modulating agent can be from about 0.1 wt. % to about 5 wt. %, from about 0.1 wt. % to about 3 wt. %, from about 0.1 wt. % to about 2 wt. %, from about 0.2 wt. % to about 5 wt. %, from about 0.2 wt. % to about 3 wt. %, from about 0.5 wt. % to about 5 wt. %, or about 0.5 wt. % to about 3 wt. %.

Other Herbicidal Compositions Additives

The liquid herbicidal compositions may optionally, and/or preferably, be further formulated with additives as described elsewhere herein (e.g., a stabilizer, one or more surfactants, an antifreeze, an anti-packing agent, drift control agents, volatility control agents, safeners, etc.).

The liquid herbicidal compositions containing the dispersion of microcapsules can be formulated to further optimize its shelf stability and safe use. Dispersants, stabilizers, and thickeners are useful to inhibit the agglomeration and settling of the microcapsules. This function is facilitated by the chemical structure of these additives as well as by equalizing the densities of the aqueous and microcapsule phases. Anti-packing agents are useful when the microcapsules are to be redispersed. A pH buffer can be used to maintain the pH of the dispersion within desired ranges.

Low molecular weight dispersants may solubilize microcapsule shell walls, particularly in the early stages of their formation, causing gelling problems. Thus, in some embodiments dispersants having relatively high molecular weights of at least about 1.5 kg/mole, more preferably of at least about 3 kg/mole, and still more preferably at least about 5, 10 or even 15 kg/mole. In some embodiments, the molecular weight may range from about 3 kg/mole to about 50 kg/mole or from about 5 kg/mole to about 50 kg/mole. Dispersants may also be non-ionic or anionic. An example of a high molecular weight, anionic polymeric dispersant is polymeric naphthalene sulfonate sodium salt, such as Invalon (formerly Irgasol, Huntsman Chemicals). Other useful dispersants and stabilizers include gelatin, casein, ammonium caseinate, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, ethylene oxide-propylene oxide block copolymers, sodium and calcium lignosulfonates, sulfonated naphthalene-formaldehyde condensates, modified starches, and modified cellulosics like hydroxyethyl or hydroxypropyl cellulose, sodium carboxy methyl cellulose, and fumed silica dispersions.

Thickeners are useful in retarding the settling process by increasing the viscosity of the aqueous phase. Shear-thinning thickeners may be preferred, because they act to reduce dispersion viscosity during pumping, which facilitates the economical application and even coverage of the dispersion to an agricultural field using the equipment commonly employed for such purpose. The viscosity of the microcapsule dispersion upon formulation may preferably range from about 100 cps to about 400 cps, as tested with a Haake Rotovisco Viscometer and measured at about 10° C. by a spindle rotating at about 45 rpm. More preferably, the viscosity may range from about 100 cps to about 300 cps. A few examples of useful shear-thinning thickeners include water-soluble, guar-or xanthan-based gums (e.g. Kelzan from CPKelco), cellulose ethers (e.g. ETHOCEL from Dow), modified cellulosics and polymers (e.g. Aqualon thickeners from Hercules), and microcrystalline cellulose anti-packing agents.

Adjusting the density of the aqueous phase to approach the mean weight per volume of the microcapsules also slows down the settling process. In addition to their primary purpose, many additives may increase the density of the aqueous phase. Further increase may be achieved by the addition of sodium chloride, glycol, urea, or other salts. The weight to volume ratio of microcapsules of preferred dimensions is approximated by the density of the core material, where the density of the core material is from about 1.05 to about 1.5 g/cm$^3$. Preferably, the density of the aqueous phase is formulated to within about 0.2 g/cm$^3$ of the mean weight to volume ratio of the microcapsules. More preferably, the density of the aqueous phase ranges from about 0.2 g/cm$^3$ less than the mean weight to volume ratio of the microcapsules to about equal to the mean weight to volume ratio of the microcapsules.

In order to enhance shelf stability and prevent gelling of dispersions of microcapsules in the liquid herbicidal compositions, particularly upon storage in high temperature environments, the liquid herbicidal compositions may further include urea or similar structure-breaking agent at a concentration of up to about 20% by weight, typically about 5% by weight.

Surfactants can optionally be included in the compositions of the present invention. Suitable surfactants are selected from non-ionics, cationics, anionics and mixtures thereof. Examples of surfactants suitable for the practice of the present invention include, but are not limited to: alkoxylated tertiary etheramines (such as TOMAH E-Series surfactants); alkoxylated quaternary etheramine (such as TOMAH Q-Series surfactant); alkoxylated etheramine oxides (such as TOMAH AO-Series surfactant); alkoxylated tertiary amine oxides (such as AROMOX series surfactants); alkoxylated tertiary amine surfactants (such as the ETHOMEEN T and C series surfactants); alkoxylated quaternary amines (such as the ETHOQUAD T and C series surfactants); alkyl sulfates, alkyl ether sulfates and alkyl aryl ether sulfates (such as the WITCOLATE series surfactants); alkyl sulfonates, alkyl ether sulfonates and alkyl aryl ether sulfonates (such as the WITCONATE series surfactants); alkoxylated phosphate esters and diesters (such as the PHOSPHOLAN series surfactants); alkyl polysaccharides (such as the AGRIMUL PG series surfactants); alkoxylated alcohols (such as the BRIJ or HETOXOL series surfactants); and mixtures thereof.

Anti-packing agents facilitate redispersion of microcapsules upon agitation of a composition in which the microcapsules have settled. A microcrystalline cellulose material such as LATTICE from FMC is effective as an anti-packing agent. Other suitable anti-packing agents are, for example, clay, silicon dioxide, insoluble starch particles, and insoluble metal oxides (e.g. aluminum oxide or iron oxide). Anti-packing agents which change the pH of the dispersion are preferably avoided, for at least some embodiments.

Drift control agents suitable for the practice of the present invention are known to those skilled in the art and include GARDIAN, GARDIAN PLUS, DRI-GARD, and PRO-ONE XL available from Van Diest Supply Co.; COMPA-DRE, available from Loveland Products, Inc.; BRONC MAX EDT, BRONC PLUS DRY EDT, EDT CONCENTRATE, and IN-PLACE available from Wilbur-Ellis Company; STRIKE ZONE DF available from Helena Chemical Co.; INTACT and INTACT XTRA available from Precision Laboratories, LLC; and AGRHO DR 2000 and AGRHO DEP 775 available from the Solvay Group. Suitable drift control agents include, for example, guar-based (e.g., containing guar gum or derivatized guar gum) drift control agents. Various drift control products may also contain one or more water conditioning agent in combination with the drift control agent(s).

Other useful additives include, for example, biocides or preservatives (e.g., PROXEL, commercially available from Avecia), antifreeze agents (such as glycerol, sorbitol, or urea), and antifoam agents (such as Antifoam SE23 from Wacker Silicones Corp.).

The herbicidal compositions described herein can further comprise an additive to control or reduce potential herbicide volatility. Under some application conditions, certain herbicides such as auxin herbicides, can vaporize into the surrounding atmosphere and migrate from the application site to adjacent crop plants, such as soybeans and cotton, where contact damage to sensitive plants can occur. For example, as described in U.S. Application Publication Nos. 2014/0128264 and 2015/0264924, which are incorporated herein by reference, additives to control or reduce potential herbicide volatility include monocarboxylic acids, or salts thereof (e.g., acetic acid and/or an agriculturally acceptable salt thereof. Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In particular, the monocarboxylic acid can be selected from the group consisting of formic acid, acetic acid, propionic acid, and benzoic acid. The monocarboxylate salt can be selected from the group consisting of formate salts, acetate salts, propionate salts, and benzoate salts. The monocarboxylate salts can include, for example, alkali metal salts selected from sodium and potassium. Preferred monocarboxylate salts include sodium acetate and potassium acetate.

The molar ratio of additional herbicide (e.g., auxin herbicide) to the monocarboxylic acid, or monocarboxylate thereof, can be typically from about 1:10 to about 10:1, from about 1:5 to about 5:1, from about 3:1 to about 1:3, or from about 2:1 to about 1:2 (e.g., about 1:1). In various herbicidal concentrate compositions, the concentration of monocarboxylic acid and/or salt thereof can be from about 0.25% to about 25%, from about 1% to about 20%, from about 2% to about 15%, from about 2% to about 10%, or from about 5% to about 15% by weight of the concentrate composition.

The herbicidal compositions described herein can further comprise can further comprise a safener in the liquid medium of the compositions (i.e., unencapsulated). As noted herein, safeners include, for example, furilazole ((RS)-3-(dichloroacetyl)-5-(2-furanyl)-2,2-dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy)acetic acid); cyometrinil ((Z)-cyanomethoxyimino(phenyl)acetonitrile); cyprosulfamide (N-[4-(cyclopropylcarbamoyl)phenylsulfonyl]-o-anisamide); dichlormid (N,N-diallyl-2,2-dichloroacetamide); dicyclonon ((RS)-1-dichloroacetyl-3,3,8a-trimethylperhydropyrrolo[1,2-a]pyrimidin-6-one); diethiolate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino(phenyl)acetonitrile); isoxadifen (4,5-dihydro-5,5-diphenyl-1,2-oxazole-3-carboxylic acid); cyprosulfamide; salts and esters thereof, and mixtures thereof.

III. Methods of Use

The present invention is also directed to various methods of using the herbicidal microcapsules and the herbicidal compositions comprising the herbicidal microcapsules as described herein. Various methods are directed to controlling weeds in a field comprising applying to the field an application mixture comprising the herbicidal microcapsules. The application mixture can be prepared from the aqueous herbicidal compositions as described herein (e.g., by diluting an aqueous herbicidal concentrate composition comprising the herbicidal microcapsules with water).

The application mixture may be applied to a field according to practices known to those skilled in the art and are preferably applied to an agricultural field within a selected timeframe of crop plant development. In various embodiments, the application mixture is applied to the soil, before planting the crop plants or after planting, but pre-emergence to the crop plants. In these and other embodiments, the application mixture is applied to a field from 1-40 days prior to planting of the crop plant and/or pre-emergence (i.e., from planting of the crop plant up to, but not including, emergence or cracking) in order to provide control of newly emerging monocots and small seeded dicot species. In other embodiments of the present invention, the application mixture is applied post-emergence to the crop plants. In various embodiments, the application mixture is applied pre-emergence to the weeds. In other embodiments, the application mixture is applied post-emergence to the weeds.

As used herein, "prior to planting of the crop plant" refers, for example, to a time period of from about 40 days prior to planting of the crop plant to immediately before planting of the crop plant, from about 35 days prior to planting of the crop plant to immediately before planting of the crop plant, from about 30 days prior to planting of the crop plant to immediately before planting of the crop plant, from about 25 days prior to planting of the crop plant to immediately before planting of the crop plant, from about 20 days prior to planting of the crop plant to immediately before planting of the crop plant, from about 15 days prior to planting of the crop plant to immediately before planting of the crop plant, from about 10 days prior to planting of the crop plant to immediately before planting of the crop plant, or from about 5 days prior to planting of the crop plant to immediately before planting of the crop plant. For purposes of the present invention, post-emergence to crop plants includes initial emergence from the soil, i.e., "at cracking."

The effective amount (use rate) of encapsulated acetamide herbicide, encapsulated second herbicide and any optional additional herbicide to be applied to an agricultural field is dependent upon the identity of the herbicides, the release rate of the microcapsules, the crop to be treated, and environmental conditions, especially soil type and moisture. Generally, use rates of acetamide herbicides, such as acetochlor, are on the order of at least about 100 g/ha (grams of active ingredient per hectare), at least about 250 g/ha, at least about 500 g/ha, or at least about 1000 g/ha. For example, the use rate of acetamide herbicides can ranges from about 100 g/ha (grams active ingredient per hectare) to about 5000 g/ha, from about 250 g/ha to about 5000 g/ha, from about 500 g/ha to about 5000 g/ha, from about 1000 g/ha to about 5000 g/ha, from about 100 g/ha to about 3000 g/ha, from about 250 g/ha to about 5000 g/ha, from about 500 g/ha to about 3000 g/ha, from about 1000 g/ha to about 3000 g/ha, from about 100 g/ha to about 2000 g/ha, from about 250 g/ha to about 2000 g/ha, from about 500 g/ha to about 2000 g/ha, from about 1000 g/ha to about 2000 g/ha, or from about 1200 g/ha to about 2000 g/ha.

Use rates of the second herbicides, such as, metribuzin, can be on the order of at least about 25 g/ha (grams acid ingredient per hectare), at least about 50 g/ha, at least about 100 g/ha, at least about 150 g/ha, at least about 200 g/ha, or at least about 250 g/ha, or ranges thereof, such as from about 25 g/ha to about 1000 g/ha, from about 50 g/ha to about 600 g/ha, from about 100 g/ha to about 600 g/ha, or from about 100 g/ha to about 300 g/ha.

Generally, use rates of additional herbicides, such as dicamba, are on the order of at least about 50 g/ha (grams acid equivalent per hectare), at least about 100 g/ha, at least about 250 g/ha, at least about 500 g/ha, at least about 1000 g/ha, at least about 1500 g/ha, at least about 2000 g/ha, at least about 2500 g/ha, or at least about 3000 g/ha, or ranges thereof, such as from about 100 g/ha to about 5000 g/ha, from about 500 g/ha to about 2500 g/ha, from about 500 g/ha to about 2000 g/ha, from about 100 g/ha to about 1000 g/ha, from about 250 g/ha to about 1000 g/ha, or from about 250 g/ha to about 900 g/ha. As used herein, the term "acid equivalent" or "a.e." refers to the amount of herbicide present without taking into account the weight of the counter-ion of the salt species if present.

Application mixtures are useful for controlling a wide variety of weeds, i.e., plants that are considered to be a nuisance or a competitor of commercially important crop plants, such as corn, soybean, wheat, barley, cotton, dry beans, snap beans, and potatoes etc. Examples of weeds that may be controlled according to the method of the present invention include, but are not limited to, Velvetleaf (*Abutilon theophrasti*), Proso Millet (*Panicum miliaceum*), Waterhemp (*Amaranthus tuberculatus*); Redroot Pigweed (*Amaranthus retroflexus*) and other weed species within the *Amaranthus* genus; Green Foxtail (*Setaria viridis*), *Setaria lutescens* and other *Setaria* spp., Morning Glory (*Ipomoea* spp.), Goosegrass (*Eleusine indica*); Meadow Foxtail (*Alopecurus pratensis*) and other weed species with the *Alopecurus* genus, Common Barnyard Grass (*Echinochloa crusgalli*) and other weed species within the *Echinochloa* genus, crabgrasses within the genus *Digitaria*, White Clover (*Trifolium repens*), Lambsquarters (*Chenopodium berlandieri*), Common Purslane (*Portulaca oleracea*) and other weed species in the *Portulaca* genus, *Chenopodium album* and other *Chenopodium* spp., *Sesbania exaltata* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., and *Conyza Canadensis* and other *Conyza* spp.

In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of *Amaranthus palmeri, Amaranthus rudis, Ambrosia artemisiifolia, Ambrosia trifida, Conyza bonariensis, Conyza canadensis, Digitaria insularis, Echinochloa colona, Eleusine indica, Euphorbia heterophylla, Lolium multiflorum, Lolium rigidum, Plantago lancelata, Sorghum halepense*, and *Urochloa panicoides*.

In some embodiments of the present invention, crop plants include, for example, corn, soybean, cotton, dry beans, snap beans, and potatoes. Particularly preferred crop species are corn, cotton, wheat, barley, and soybean. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), *Bacillus thuringiensis* (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides, In other embodiments the crop plants are tolerant to glyphosate, dicamba, 2,4-D, MCPA, quizalofop, glufosinate, metribuzin and/or diclofop-methyl. In other embodiments, the crop plant is glyphosate and/or dicamba tolerant. In some embodiments of the present invention, crop plants are glyphosate and/or glufosinate tolerant. In further embodiments, the crop plants are glyphosate, glufosinate and dicamba tolerant. In these and other embodiments, the crop plants are tolerant to PPO inhibitors. In certain embodiments, the crop plants are tolerant to metribuzin.

The methods of the present invention can also provide for improved residual weed control. As noted, the release properties of microencapsulated acetamide herbicides can be particularly sensitive to additives in the core material of the microcapsules. However, co-encapsulation of the acetamide herbicide and the second herbicide, particularly metribuzin, in accordance with the present invention has been found to be effective in providing controlled release of both herbicides over time as compared to unencapsulated herbicide compositions while still providing commercially acceptable rate of weed control. For example, microencapsulated acetamide herbicides of the present invention can provide commercially acceptable rate of weed control for at least 28 days, at least 35 days, at least 42 days, or more.

Various methods for improving residual weed control comprise applying to a field an application mixture comprising the herbicidal microcapsules as described herein. In some embodiments, the herbicidal microcapsule comprises a core material comprising an acetamide herbicide and metribuzin as the second herbicide, wherein at least a portion of the metribuzin is dissolved in the acetamide herbicide; and a shell wall encapsulating the core material, wherein the shell wall comprises a polyurea. In further embodiments, the application mixture also comprises a salt of dicamba (e.g., sodium or diglycolamine salt of dicamba). Application mixtures comprising microencapsulated acetamide and metribuzin herbicides and a salt dicamba can provide for improved residual weed control, especially for broadleaf weed control. In some embodiments, a commercially acceptable rate of weed control of at least about 90%, at least about 92%, or at least about 95% can be achieved at about 28 days after treatment (DAT). In these and other embodiments, a commercially acceptable rate of weed control of at least about 85%, at least about 87%, or at least about 90%, at least about 92% can be achieved at about 42 days after treatment (DAT). In various embodiments, these rates of weed control can be achieved for broadleaf weeds selected from the group consisting of Velvetleaf (*Abutilon theophrasti*), Common Waterhemp (*Amaranthus rudis*), Tall Waterhemp (*Amaranthus tuberculatus*), Redroot Pigweed (*Amaranthus retroflexus*) and other weed species within the *Amaranthus* genus, Common Purslane (*Portulaca oleracea*) and other weed species in the *Portulaca* genus, Morning Glory (*Ipomoea* spp.), *Sesbania exaltata* spp., Venice Mallow (*Hibiscus trionum*), Prickly sida (*Sida spinosa*), *Mollugo verticillata, Desmodium* spp., and combinations thereof.

In these and other embodiments, the acetamide herbicide is applied at a use rate of from about 100 g/ha (grams active ingredient hectare) to about 5000 g/ha, from about 250 g/ha to about 5000 g/ha, from about 500 g/ha to about 5000 g/ha, from about 1000 g/ha to about 5000 g/ha, from about 100 g/ha to about 3000 g/ha, from about 250 g/ha to about 5000 g/ha, from about 500 g/ha to about 3000 g/ha, from about 1000 g/ha to about 3000 g/ha, from about 100 g/ha to about 2000 g/ha, from about 250 g/ha to about 2000 g/ha, from about 500 g/ha to about 2000 g/ha, from about 1000 g/ha to about 3000 g/ha, or from about 1000 g/ha to about 2000 g/ha. The metribuzin can be applied at a use rate of from about 200 g/ha (grams active ingredient per hectare) to about 600 g/ha, from about 280 g/ha to about 560 g/ha or from about 280 g/ha to about 420 g/ha. Also, the salt of dicamba can be applied at a use rate is from about 100 g/ha (grams acid equivalent per hectare) to about 1000 g/ha, from about 250 g/ha to about 1000 g/ha, or from about 250 g/ha to about 900 g/ha.

A "commercially acceptable rate of weed control" varies with the weed species, degree of infestation, environmental conditions, and the associated crop plant. Typically, commercially effective weed control is defined as the destruction (or inhibition) of at least about 60%, 65%, 70%, 75%, 80%, or even at least 85%, or even at least 90%. Although it is generally preferable from a commercial viewpoint that 80-85% or more of the weeds be destroyed, commercially acceptable weed control can occur at much lower destruction or inhibition levels, particularly with some very noxious, herbicide-resistant plants.

The herbicidal microcapsules of the present invention can also provide for improved crop safety. A "commercially acceptable rate of crop injury" varies with the crop plant species. Typically, a commercially acceptable rate of crop injury is defined as less than about 20%, 15%, 10% or even less than about 5%. In various embodiments, the herbicidal microcapsules and methods of the present invention limit crop injury to a commercially acceptable rate as measured from about 24 hours (about 1 Day After Treatment or DAT) after application to two weeks (about 14 DAT), from about 24 hours (about 1 DAT) after application to three weeks (about 21 DAT), or from about 24 hours (about 1 DAT) to about four weeks (about 28 DAT).

Rates of weed control and crop injury are determined as a percentage as compared to untreated plants following a standard procedure where visual assessment of plant mortality and growth reduction is made by one specially trained to make such assessments.

Although various methods discussed herein reference applying an application mixture to "a field of crop plants," it is understood that these methods can include applying the mixture to fields that are to be planted with crop plants (e.g., for pre-plant application or burndown in fallow fields). Further, even though various methods reference weeds in a "field," this term is inclusive of smaller, discrete areas, such as a pot of soil or raised bed (e.g., in a greenhouse setting).

Improved Methods of Use for Crops

As noted, metribuzin is one preferred second herbicide for co-encapsulation with an acetamide herbicide (such as acetochlor) in the herbicidal microcapsules as described herein. Conventionally, metribuzin has not been applied via over-the-top (OTT) application on some crops such as soybeans due to unacceptable crop injury if excess metribuzin contacts the crops. Typically, this type of injury is encountered when metribuzin is applied using an application mixture containing a suspension of metribuzin or metribuzin dissolved in a solvent. To prevent significant crop injury, metribuzin-containing products are labeled with various application restrictions. For example, metribuzin is labeled for pre-emergence application for some soybean varieties but is not currently labeled for post-emergence application on soybeans due to crop response to this herbicide.

Other types of label restrictions for metribuzin limit its application to certain soil contain and its use rate. For example, in corn, metribuzin should not be applied in areas where the soil has a pH of 7.0 or higher or has an organic matter content less than 1.5%. Also, the maximum use rate in growing season is typically restricted to 0.25 lbs/acre (approximately 280 g/ha). For soybeans, application of metribuzin should be avoided when the soil pH is 7.5 or higher or the organic matter content is less than 0.5%. Even with these precautions, excessive crop injury can still occur if the soybean variety is sensitive to metribuzin. As a result, soybean varieties are routinely tested for metribuzin sensitivity/tolerance to provide the grower with necessary information to avoid excessive crop injury or loss. Regardless of the many precautions that must be followed to avoid crop injury, application of metribuzin is still desirable because it provides residual control of an assortment of annual grasses and broadleaf weeds including glyphosate-resistant weed species such as *Palmer amaranth* and uses a different mode of action as compared to acetamide herbicides.

It has been found that co-encapsulation of metribuzin with an acetamide herbicide provides for a sufficiently controlled release of metribuzin such that enhanced crop safety can be achieved. Surprisingly, the enhanced crop safety of the herbicidal microcapsules of the present invention has been found, in some instances, to significantly lessen the precautions needed when applying metribuzin and permits use of the herbicide over a broader range of crop varieties. Moreover, the enhanced crop safety of the herbicidal microcapsules of the present invention even permits application of metribuzin via over-the-top spraying. In accordance with these discoveries, the present invention includes further methods for controlling weeds in fields of crop plants, especially those comprising corn, soybeans, wheat, and/or barley.

Further methods for controlling weeds in a field of corn generally comprise applying to the field an application mixture comprising an herbicidal microcapsule comprising a core material comprising an acetamide herbicide and metribuzin as the second herbicide, wherein at least a portion of the metribuzin is dissolved in the acetamide herbicide; and a shell wall encapsulating the core material, wherein the shell wall comprises a polyurea. In various embodiments, the application mixture is applied to the field (i) prior to planting the corn or (ii) pre-emergence to the corn. In other embodiments, the application mixture is applied to the field post-emergence to the corn. In various embodiments, the field is characterized by a soil pH of 7.0 or greater (e.g., about 7.2 or greater, about 7.5 or greater, about 8 or greater, or ranges from about 7.2 to about 9 or from about 7.2 to about 9). In these and other embodiments, the field is characterized by soil having an organic matter content that is less than about 1.5% (e.g., from about 0.1% to about 1.5% or from about 0.5% to about 1.5%).

Further methods of the present invention for controlling weeds in a field of soybeans generally comprise applying to the field an application mixture comprising an herbicidal microcapsule comprising a core material comprising an acetamide herbicide and metribuzin as the second herbicide, wherein at least a portion of the metribuzin is dissolved in the acetamide herbicide; and a shell wall encapsulating the core material, wherein the shell wall comprises a polyurea. In various embodiments, the application mixture is applied to the field (i) prior to planting the soybeans or (ii) pre-emergence to the soybeans. In other embodiments, the application mixture is applied to the field post-emergence to the soybeans. In various embodiments, the field is characterized by a soil pH of 7.5 or greater (e.g., about 7.7 or greater, about 8 or greater, or ranges from about 7.5 to about 8.5 or from about 7.5 to about 8). In these and other embodiments, the field is characterized by soil having an organic matter content that is less than about 0.5% (e.g., from about 0.1% to about 0.5%).

As noted, the herbicidal microcapsules have been found to provide for enhanced crop safety for metribuzin. Surprisingly, the enhanced crop safety permits pre-plant and pre-emergence application of metribuzin in fields comprising soybean varieties that are sensitive to metribuzin (as well as in varieties that are moderately sensitive, moderately tolerant, and tolerant to metribuzin). Typically, in these methods, crop injury is less than about 20%, 15%, 10% or even less than about 5% as measured at 21 days after treatment (DAT). In various embodiments of this method, crop injury is less than about 20%, less than about 15%, less than about 10% or even less than about 5% as measured at about 14 DAT and/or about 21 DAT when metribuzin is applied at a use rate of no greater than about 600 g/ha (grams active ingredient per hectare), no greater than about 560 g/ha, no greater than about 420 g/ha, or no greater than about 300 g/ha. In various embodiments of this method, crop injury is less than about 20%, less than about 15%, less than about 10% or even less than about 5% as measured at about 14 DAT and/or about 21 DAT when metribuzin is applied at a use rate of from about 200 g/ha (grams active ingredient per hectare) to about 600 g/ha, from about 280 g/ha to about 560 g/ha, or from about 280 g/ha to about 420 g/ha.

Perhaps even more surprising, the enhanced crop safety of the herbicidal microcapsules of the present invention permits post-emergence application of metribuzin in fields comprising soybean varieties that are moderately sensitive to metribuzin (as well as in varieties that are moderately tolerant and tolerant to metribuzin). Typically, in these methods, crop injury is less than about 20%, less than about 15%, less than about 10%, less than about 5%, or even 0% as measured at about 14 DAT and/or 21 DAT. In various embodiments of this method, crop injury is less than about 20%, less than about 15%, less than about 10% or even less than about 5% as measured at about 14 DAT and/or about 21 DAT when metribuzin is applied at a use rate of no greater than about 600 g/ha (grams active ingredient per hectare), no greater than about 560 g/ha, no greater than about 420 g/ha, no greater than about 300 g/ha, no greater than about 280 g/ha, or no greater than about 250 g/ha. In various embodiments of this method, crop injury is less than about 20%, less than about 15%, less than about 10% or even less than about 5% as measured at about 14 DAT and/or about 21 DAT when metribuzin is applied at a use rate of from about 50 g/ha (grams active ingredient per hectare) to about 600 g/ha, from about 50 g/ha to about 560 g/ha, from about 50 g/ha to about 420 g/ha, from about 50 g/ha to about 300 g/ha, from about 50 g/ha to about 280 g/ha, from about 50 g/ha to about 250 g/ha, from about 50 g/ha to about 200 g/ha, from about 100 g/ha to about 600 g/ha, from about 100 g/ha to about 560 g/ha, from about 100 g/ha to about 420 g/ha, from about 100 g/ha to about 300 g/ha, from about 100 g/ha to about 280 g/ha, from about 100 g/ha to about 250 g/ha, from about 100 g/ha to about 200 g/ha, from about 150 g/ha to about 600 g/ha, from about 150 g/ha to about 560 g/ha, from about 150 g/ha to about 420 g/ha, from about 150 g/ha to about 300 g/ha, from about 150 g/ha to about 280 g/ha, or from about 150 g/ha to about 250 g/ha.

Soybean sensitivity to metribuzin is determined experimentally. One laboratory method is conducted as follows. Six seeds of a soybean line are placed on a heavy weight 8 inches by 12 inches germination paper at 3 cm from the top with the seed integument pointed downwards. These germination papers are placed upright in beakers and tested at two different metribuzin concentrations, 8 and 12 µM. The beakers are placed in lighted growth chambers at 25° C. Injury ratings are taken on fully expanded unifoliate leaves of each emerged seedlings 9 days after treatment using a 0 to 6 rating scale (0=no injury and 6=severe necrosis). Based on phenotype scores for each line at 8 and 12 µM metribuzin, and compared to "Check Lines" included in each assay and previously rated for metribuzin injury using in-house greenhouse tests and other various field and greenhouse studies, each line is given a rating: Tolerant, Moderately Tolerant, Moderately Sensitive, or Sensitive. The sensitivity rating to metribuzin can be approximated to a percent crop injury according to the following scale:

| Rating | 8 µM | 12 µM | 0-100% (field/GH rating scale) |
| --- | --- | --- | --- |
| Tolerant | <1 | <2 | <10% injury |
| Moderately Tolerant | ≤1 | ≥2 and <3 | ≥10% but <15% injury |
| Moderately Sensitive | >1 and <3 | ≥3 and <4 | ≥15% but <30% injury |
| Sensitive | ≥3 | ≥4 | ≥30% injury |

It should be noted however, that soybeans that are determined to be have some degree of tolerance to pre-emergence application of metribuzin may still exhibit significant injury if metribuzin is applied post-emergence. Also, although a soybean variety may exhibit initial signs of crop injury to metribuzin, in some cases, the signs of crop injury may not negatively impact crop yield.

The metribuzin sensitivity of many soybean varieties is known in the art. A list of soybean varieties that have tested for metribuzin sensitivity is provided in "Metribuzin Tolerance Testing of Soybean Varieties—2016," University of Arkansas, Division of Agriculture, Research and Extension, published online, which is incorporated herein by reference. Also, U.S. Patent Application Publication No. 2015/0216135 describes methods for genetically screening soybean varieties for metribuzin sensitivity.

Some wheat and barley varieties are also known to exhibit metribuzin sensitivity. Accordingly, the enhanced crop safety of the herbicidal microcapsules of the present invention permits application of metribuzin in fields comprising wheat and barley varieties that are sensitive to metribuzin.

EXAMPLES

The following non-limiting examples are provided to further illustrate the present invention. The composition numbers used throughout the examples indicate corresponding compositions or dilutions thereof when repeated.

Example 1

A series of dispersions of herbicidal microcapsules containing acetochlor and metribuzin were prepared according to the following general procedure. The herbicide content of the microcapsules is provided in Table 1-1.

TABLE 1-1

Herbicide Content

| Composition No. | Acetochlor content (% a.i. by mass) | Metribuzin content (% a.i. by mass) | Total of All Actives % |
|---|---|---|---|
| 10035690-02 | 36.10 | 8.10 | 44.20 |
| 1003590-04 | 36.10 | 8.10 | 44.20 |
| 10035690-05 | 36.10 | 8.10 | 44.20 |
| 10035690-05-1 | 35.80 | 8.00 | 43.80 |
| 10038214 | 36.00 | 8.00 | 44.00 |
| 10038215 | 36.00 | 8.00 | 44.00 |
| 10038216 | 36.00 | 8.00 | 44.00 |
| 10038217 | 36.00 | 8.00 | 44.00 |
| 10038221 | 36.00 | 8.00 | 44.00 |
| 10038222 | 36.00 | 8.00 | 44.00 |
| 10038273 | 36.00 | 8.00 | 44.00 |
| 10034759 | 27.5 | 5.5 | 33.0 |
| 10044367 | 36.10 | 8.05 | 44.15 |
| 10044367-03 | 36.00 | 8.00 | 44.00 |
| 10045210-01 | 36.00 | 8.00 | 44.00 |
| 10045210-02 | 36.00 | 8.00 | 44.00 |
| 10045210-03 | 36.00 | 8.00 | 44.00 |
| 10045210-04 | 36.00 | 8.00 | 44.00 |

The process of microencapsulation is conducted using an interfacial polycondensation technique. Generally, this technique involves preparing an oil or discontinuous phase liquid containing the herbicides to be encapsulated, the first reactive monomeric/polymeric material(s) (e.g., polyisocyanate), and any additional components to be encapsulated, such as solvents or safeners. In this case, the discontinuous phase liquid was prepared with the herbicides listed in Table 1-1 and the components listed in Table 1-2.

The acetochlor and metribuzin were charged to a mixing vessel and mixed. If necessary, the mixing vessel was heated to increase the dissolution of metribuzin in the acetochlor. Next, the solvent, ISOPAR M, was charged to the mixing vessel, followed by the polyisocyanates, DESMODUR N3200 and DESMODUR W. The solution was agitated to obtain a homogenous solution. Prior to further use, the mixture was heated to 45° C. in an oven.

TABLE 1-2

Other Discontinuous Phase Components

| Ingredient | component wt. % active | wt. % in final composition |
|---|---|---|
| ISOPAR M (solvent, $C_{11}$-$C_{16}$ isoalkanes) | 100 | 2.32 |
| Blend of DES N3200 and DES W (85% by weight trimer of hexamethylene-1,6-diisocyanate: 15% by weight 4,4'-diisocyanato-dicyclohexyl methane) | 100 | 3.26 |

The interfacial polycondensation technique also requires preparation of an aqueous or continuous phase liquid containing, among other components, the second reactive monomeric or polymeric material (e.g., polyamine). The continuous phase was prepared with the components listed in Table 1-3. A mixing vessel was charged with water and the remaining external phase component except for TETA. The solution was agitated to obtain a clear homogenous solution. The solution may be sealed within the mixing vessel and stored until needed. Prior to use, the mixture was heated to 45° C. in an oven.

TABLE 1-3

Continuous Phase Components

| Ingredient | wt. % active | wt. % in final concentrate composition |
|---|---|---|
| Glycerin | 100 | 8.41 |
| SOKALAN CP9 (maleic acid-olefin copolymer) | 25 | 2.56 |
| Ammonium Caseinate | 100 | 0.05 |
| Citric Acid | 50 | 0.15 |
| Urea | 50 | 5.0 |
| Water | 100 | 33.41 |
| Triethylenetetramine (TETA) | 50 | 1.655 |

Following preparation of the discontinuous phase and the continuous phase liquids, an interfacial polymerization medium was prepared by first charging the continuous phase liquid (without the polyamine) to a Waring blender cup that has been preheated to 45° C. The commercial Waring blender (Waring Products Division, Dynamics Corporation of America, New Hartford, Conn., Blender 700) was powered through a 0 to 120 volt variable autotransformer. The blender mix speed was varied by controlling power to the blender. The discontinuous phase liquid was then added to the continuous phase liquid over a brief interval and blending was continued to obtain an emulsion.

To initiate polymerization of the polyisocyanate (formation of the polyurea shell wall) and encapsulation of the discontinuous phase liquid, TETA (the polyamine) was added to the emulsion over a period of about 5 seconds. The blender speed was then reduced to a speed which just produces a vortex for approximately five to fifteen minutes. The emulsion was then transferred to a hot plate and stirred. The reaction vessel was covered and maintained at about 45° C. for approximately two hours which has been found is sufficient time for the isocyanate to react essentially completely.

The microcapsule slurry is then allowed to cool to close to room temperature. The microcapsules of acetochlor and metribuzin were then mixed with a stabilizer having the ingredients listed below in Table 1-4 to form an aqueous dispersion of the microcapsules. The components shown in Table 1-4 with the exception of the buffer are previously premixed with a high speed mixer (Waring Blender or Cowles Dissolver). The resulting stabilizer premix is then added to the capsule slurry to stabilize the dispersion of microcapsules. Finally the buffer is added and the mixture is stirred for at least 15 minutes until visually homogeneous.

TABLE 1-4

Stabilizer Components

| Ingredient | wt. % active | wt. % in concentrate composition |
|---|---|---|
| KELZAN CC (xanthan gum) | 100 | 0.06 |
| Urea | 50 | 5 |

TABLE 1-4-continued

| | Stabilizer Components | |
|---|---|---|
| Ingredient | wt. % active | wt. % in concentrate composition |
| INVALON DAM (naphthalene sulfonate condensate) | 40 | 6.76 |
| AGNIQUE DFM-111S (silicone based defoamer) | 100 | 0.001 |
| PROXEL GXL (solution of 1,2-benzisothiazolin-3-one | 100 | 0.06 |
| Caustic (NaOH) | 20 | 0.02 |
| Disodium phosphate | 100 | 0.201 |

The microcapsules were prepared using an approximate 20% excess of amine molar equivalents to isocyanate molar equivalents. TETA has an approximate equivalent weight of 36.6 g/mol. The theoretical equivalent weight of the biuret-containing adduct (i.e., trimer) of hexamethylene-1,6-diisocyanate is 159.5 g/mol. The actual equivalent weight of the trimer of hexamethylene-1,6-diisocyanate ("DES N3200"), the commercially available product, is about 183 g/mol. The equivalent weight for 4,4'-diisocyanato-dicyclohexyl methane ("DES W") is 132 g/mol.

The mean particle size of the microcapsules was analyzed using a Coulter LS Particle Size Analyzer. The results are presented in Table 1-5.

TABLE 1-5

| | Mean Particle Size |
|---|---|
| Composition No. | Mean Particle Size (μm) |
| 10035690-02 | 12.4 |
| 10035690-04 | 9.3 |
| 10035690-05 | 7.1 |
| 10035690-05-1 | 4.6 |
| 10038214 | 7.1 |
| 10038215 | 4.6 |
| 10038216 | 2 |
| 10038217 | 9.3 |
| 10038221 | 10.1 |
| 10038222 | 10.7 |
| 10038273 | 12.4 |
| 10044367 | 5.0 |
| 10044367-03 | 4.7 |
| 10045210-01 | 9.5 |
| 10045210-02 | 7.9 |
| 10045210-03 | 6.1 |
| 10045210-04 | 2 |

Figure 2:
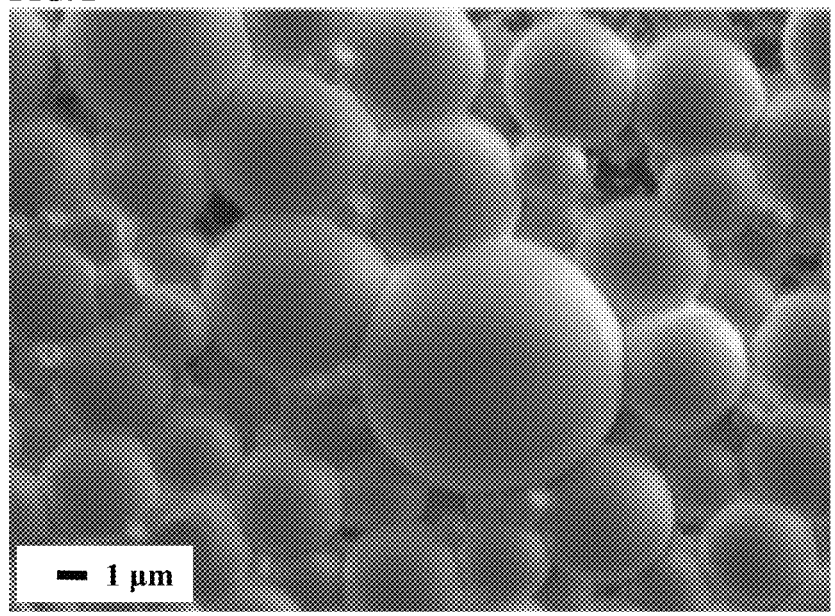
FIG. 2 shows a scanning electron microscopy image of microcapsules containing acetochlor and metribuzin.

Selected microcapsules (10034759) were also imaged using a scanning electron microscope. FIGS. 1 and 2 show that the microcapsules were uniform and that the microencapsulation process was complete and free from crystallization and other abnormalities.

Example 2

For the purposes of estimating the potential for crop injury of the microencapsulated acetochlor and metribuzin, the acetochlor and metribuzin release rate profiles were measured in the laboratory using a SOTAX AT-7 (SOTAX Corporation; Horsham, PA 19044) agitated dissolution test apparatus. Application mixtures where prepared by diluting selected microcapsule dispersions prepared in Example 1 with deionized water at 25° C. to an acetochlor concentration of 1% by weight of the microencapsulated acetochlor herbicide active ingredient. Composition references listed on the tables below indicate the corresponding concentrate composition that was used to prepare the application mixture. A composition containing a mixture of metribuzin millbase (non-encapsulated) and microencapsulated acetochlor (WARRANT) was also tested for comparison (10035690-06). The microencapsulated acetochlor was prepared in accordance with the procedure described in Example 1 with the exception that the metribuzin was not co-encapsulated with the acetochlor. The mean particle size of the microencapsulated acetochlor in the comparative formulation was approximately 10 μm. An aliquot of each solution was sampled at 0 hours (initial), 4 hours, and 24 hours. Each aliquot was filtered through a syringe filter (TARGET Cellulose Acetate 0.2 μm, ThermoFisher Scientific) to remove any capsules. The resulting solution was then analyzed for acetochlor and metribuzin by HPLC. The results of the release rate tests are presented in Tables 2-1 and 2-2.

TABLE 2-1

Acetochlor Release Rate Test Results

| | Acetochlor Release | | | | | |
|---|---|---|---|---|---|---|
| | 0 hours (initial) | | 4 hours | | 24 hours | |
| Composition Reference | ppm | % release | ppm | % release | ppm | % release |
| 10035690-02 | 74.12 | 0.74 | 91.5 | 0.91 | 121.47 | 1.21 |
| 10035690-04 | 47.47 | 0.47 | 59.82 | 0.6 | 80.6 | 0.81 |
| 10035690-05 | 53.85 | 0.54 | 68.62 | 0.69 | 92.83 | 0.93 |
| 10035690-05-1 | 46.46 | 0.46 | 59.36 | 0.59 | 75.86 | 0.76 |
| 10038214 | 60.0 | — | 102.0 | — | 150.0 | — |
| 10038215 | 53.0 | — | 176.0 | — | 225.0 | — |
| 10038216 | 65.0 | — | 242.0 | — | 260.0 | — |
| 10038217 | 64.0 | — | 97.0 | — | 130.0 | — |
| 10038221 | 54.0 | — | 80.0 | — | 117.0 | — |
| 10038273 | 55.0 | — | 75.0 | — | 106.0 | — |
| 10035690-06 (comparative) | 122.03 | 1.22 | 129.72 | 1.3 | 142.23 | 1.42 |

TABLE 2-2

Metribuzin Release Rate Test Results

| | Metribuzin Release | | | | | |
|---|---|---|---|---|---|---|
| | 0 hours (initial) | | 4 hours | | 24 hours | |
| Composition Reference | ppm | % release | ppm | % release | ppm | % release |
| 10035690-02 | 61.19 | 2.73 | 106.8 | 4.76 | 184.21 | 8.21 |
| 10035690-04 | 44.85 | 2 | 81.92 | 3.65 | 147.93 | 6.59 |
| 10035690-05 | 49.8 | 2.22 | 81.26 | 3.62 | 147.58 | 6.58 |
| 10035690-05-1 | 44.04 | 2.07 | 68.8 | 3.24 | 111.52 | 5.25 |
| 10038214 | 53.0 | | 100.0 | | 230.0 | |
| 10038215 | 63.0 | | 324.0 | | 553.0 | |
| 10038216 | 80.0 | | 519.0 | | 324.0 | |
| 10038217 | 50.0 | | 80.0 | | 167.0 | |
| 10038221 | 45.0 | | 77.0 | | 162.0 | |
| 10038273 | 41.0 | | 66.0 | | 134.0 | |
| 10035690-06 (comparative) | 918.93 | 40.95 | 943.58 | 42.05 | 917.8 | 40.9 |

The release rate results show that both acetochlor and metribuzin were gradually released from the microcapsules while the unencapsulated metribuzin in the comparative composition reach saturation immediately once the composition was put into solution. Notably, over 40% of the metribuzin was in solution initially in the comparative composition while less than 3% was released from the test compositions initially.

Example 3

A dispersion of herbicidal microcapsules containing acetochlor and metribuzin was prepared according to the procedure described in Example 1, with the exception that polyurea microcapsules were prepared using an approximate 5% excess of amine molar equivalents to isocyanate molar equivalents. Also, a safener, furilazole, was encapsulated with the acetochlor and metribuzin. Table 3-1 presents the details of the composition. The mean particle size was analyzed using a Coulter LS Particle Size Analyzer.

TABLE 3-1

| Composition No. | Acetochlor content (% a.i. by mass) | Metribuzin content (% a.i. by mass) | Safener content (% by mass) | Mean Particle Size (μm) |
|---|---|---|---|---|
| 10036080-02 | 34.36 | 7.64 | 1.07 | 2.0 |

Chemical stability of the composition was also tested. The composition was subjected to a prolonged heating test at 54° C. The microcapsules were sampled at select periods of time and analyzed for acetochlor, metribuzin and safener content. Safener content was only measured at 29 days of aging. Table 3-2 presents the results of this test.

TABLE 3-2

| | Aging | Acetochlor % | | % Metribuzin | | % Safener | |
|---|---|---|---|---|---|---|---|
| Sample | Time (days) | initial | after aging | initial | after aging | initial | after aging |
| 1 | 29 | 64.1 | 65.0 | 14.3 | 14.8 | 16.9 | 17.0 |
| 2 | 37 | 81.0 | 82.0 | 18.0 | 18.7 | — | — |
| 3 | 47 | 85.0 | 84.7 | 14.3 | 14.1 | — | — |

An additional aqueous herbicidal concentrate composition was prepared by mixing herbicidal microcapsules containing acetochlor and metribuzin with water. The herbicidal microcapsules containing acetochlor and metribuzin were prepared in general accordance with the procedure described in Example 1, except that the microcapsules were prepared using approximately 5% excess of amine molar equivalents to isocyanate molar equivalents. Also, a safener, furilazole, was encapsulated with the acetochlor and metribuzin. The details of the concentrate compositions are provided in Table 3-3.

TABLE 3-3

| Composition No. | Acetochlor content (% a.i. by mass) | Metribuzin content (% a.i. by mass) | Safener content (% by mass) |
|---|---|---|---|
| 10037792 | 29.78 | 2.98 | 0.5 |

Example 4

A series of aqueous herbicidal concentrate compositions were prepared by mixing herbicidal microcapsules containing acetochlor and metribuzin with water. The herbicidal microcapsules containing acetochlor and metribuzin were prepared in general accordance with the procedure described in Example 1. The microcapsules of these compositions were prepared using an approximate 20% excess of amine molar equivalents to isocyanate molar equivalents, with the exception of 10037439-01 and 10037439-02, which were prepared using approximately 5% excess of amine molar equivalents to isocyanate molar equivalents. The details of the concentrate compositions are provided in Table 4-1. Mean particle size of the microcapsules was analyzed using a Coulter LS Particle Size Analyzer.

TABLE 4-1

| Composition No. | Acetochlor content (% a.i. by mass) | Metribuzin content (% a.i. by mass) | Mean Particle Size (μm) |
|---|---|---|---|
| 10036519-01 | 23.07 | 5.13 | 10.2 |
| 10036519-02 | 23.07 | 5.13 | 9.7 |
| 10036519-03 | 23.07 | 5.13 | 9.8 |
| 10037436-03 | 23.20 | 5.16 | 10.1 |
| 10037439-01 | 22.68 | 5.04 | 2.0 |
| 10037439-02 | 22.68 | 5.04 | 2.0 |
| 10040905-01 | 23.07 | 5.12 | 12.4 |
| 10040905-02 | 23.07 | 5.12 | 9.3 |
| 10040905-03 | 23.07 | 5.12 | 7.1 |
| 10040905-04 | 23.07 | 5.12 | 4.6 |
| 10040905-05 | 23.07 | 5.12 | 2 |

Example 5

Greenhouse tests were conducted to evaluate pre-emergence weed control on Velvetleaf (ABUTH) and Proso Millet (PANMI) for herbicidal application mixtures prepared from selected concentrate compositions described in Example 1. Composition references listed on the tables below indicate the corresponding concentrate composition that was used to prepare the application mixture. Weed control for the application mixtures was compared to that for application mixtures of (a) WARRANT, a microencapsulated acetochlor product available from Monsanto Co., St. Louis, Missouri with TRICOR, an unencapsulated metribuzin product available from United Phosphorus, Inc. and (b) HARNESS, an unencapsulated acetochlor herbicide in an emulsifiable concentrate with TRICOR. The herbicide use rates for these compositions were 1260 g/ha for acetochlor and 280 g/ha for metribuzin.

The weed seeds were planted in 3.5-inch square plastic pots filled with a potting media of 50% silt loam soil and 50% Redi-earth (Sun Gro, Bellevue, WA) with 100 g/cu-ft Osmocote 14-14-14 slow release fertilizer. Growth conditions were 28° C. day and 21° C. night with 16 hours of supplemental light (approximately 600 microeinsteins). Overhead irrigation water was applied only as needed to maintain soil moisture. The aqueous herbicidal application mixtures containing the microcapsules were applied to the plants with a track sprayer generally using a Teejet 110015 or 9501E spray nozzle or similar nozzle with air pressure set at a minimum of 165 kPa. The spray nozzle was 16 inches above the top of the plants and a spray volume rate of between about 140 to 187 L per hectare was applied.

Tables 5-1, 5-2, 5-3, and 5-4 present the results at seven day intervals. The percent control is average from nine replicates for each composition.

TABLE 5-1

| Composition Reference | Percent Control on Velvetleaf (ABUTH) | | | | | | Particle size (μm) |
|---|---|---|---|---|---|---|---|
| | 0 Day | 7 Day | 14 Day | 21 Day | 28 Day | 35 Day | |
| WARRANT + TRICOR | 98.8 | 88.8 | 85.6 | 85.6 | 54.4 | 65.0 | 10 |
| HARNESS + TRICOR | 93.5 | 100.0 | 97.5 | 88.8 | 66.3 | 61.3 | — |
| 10035690-02 | 77.3 | 81.3 | 83.1 | 91.9 | 91.9 | 89.4 | 12.4 |
| 10035690-04 | 17.5 | 54.4 | 68.1 | 88.1 | 65.6 | 81.9 | 9.3 |
| 10035690-05 | 41.9 | 48.8 | 58.8 | 45.0 | 10.0 | 56.9 | 7.1 |
| 10035690-05-1 | 78.8 | 63.1 | 80.6 | 88.8 | 40.0 | 60.6 | 4.6 |
| 10035690-06 (comparative) | 91.0 | 97.5 | 90.0 | 98.1 | 78.8 | 66.0 | 10 |

TABLE 5-2

| Composition Reference | Percent Control on Proso Millet (PANMI) | | | | | | Particle size (μm) |
|---|---|---|---|---|---|---|---|
| | 0 Day | 7 Day | 14 Day | 21 Day | 28 Day | 35 Day | |
| WARRANT + TRICOR | 90.0 | 65.6 | 88.5 | 98.8 | 67.5 | 94.4 | 10 |
| HARNESS + TRICOR | 100.0 | 100.0 | 100.0 | 100.0 | 96.9 | 98.8 | — |
| 10035690-02 | 95.0 | 90.6 | 100.0 | 100.0 | 96.0 | 98.8 | 12.4 |
| 10035690-04 | 67.5 | 82.5 | 92.5 | 93.8 | 99.4 | 96.3 | 9.3 |
| 10035690-05 | 78.8 | 82.5 | 86.3 | 98.8 | 95.0 | 100.0 | 7.1 |
| 10035690-05-1 | 85.0 | 87.5 | 85.4 | 98.8 | 96.9 | 98.1 | 4.6 |
| 10035690-06 (comparative) | 90.0 | 73.1 | 61.3 | 83.1 | 88.1 | 80.0 | 10 |

TABLE 5-3

| Composition Reference | Percent Control on Velvetleaf (ABUTH) | | | | | | Particle size (μm) |
|---|---|---|---|---|---|---|---|
| | 0 Day | 7 Day | 14 Day | 21 Day | 28 Day | 35 Day | |
| WARRANT + TRICOR | 48.3 | 83.3 | 67.2 | 31.7 | 0.0 | 0.0 | 10 |
| HARNESS + TRICOR | 55.6 | 92.2 | 81.7 | 51.7 | 13.9 | 21.1 | — |
| 10038214 | 22.2 | 85.6 | 90.9 | 60.0 | 49.4 | 29.4 | 7.1 |
| 10038215 | 60.0 | 88.3 | 91.2 | 58.3 | 53.9 | 45.0 | 4.6 |
| 10038216 | 53.3 | 98.3 | 84.2 | 58.3 | 33.3 | 25.0 | 2 |
| 10038217 | 28.3 | 82.2 | 71.7 | 68.3 | 2.8 | 7.8 | 9.3 |
| 10038221 | 21.7 | 64.4 | 72.2 | 53.3 | 23.3 | 12.1 | 10.1 |
| 10038222 | 33.3 | 76.7 | 65.0 | 47.8 | 6.1 | 11.1 | 10.7 |
| 10038273 | 35.6 | 55.6 | 70.0 | 48.9 | 3.9 | 19.4 | 12.4 |

TABLE 5-4

| Composition Reference | Percent Control on Proso Millet (PANMI) | | | | | | Particle size (μm) |
|---|---|---|---|---|---|---|---|
| | 0 Day | 7 Day | 14 Day | 21 Day | 28 Day | 35 Day | |
| WARRANT + TRICOR | 86.7 | 80.3 | 56.7 | 72.2 | 77.2 | 88.4 | 10 |
| HARNESS + TRICOR | 99.3 | 99.6 | 99.6 | 97.9 | 94.2 | 91.4 | — |
| 10038214 | 83.3 | 97.1 | 97.7 | 98.2 | 95.4 | 99.9 | 7.1 |
| 10038215 | 97.6 | 99.9 | 99.8 | 99.3 | 100.0 | 99.9 | 4.6 |
| 10038216 | 99.7 | 100.0 | 99.6 | 99.8 | 98.9 | 96.9 | 2 |
| 10038217 | 76.7 | 82.6 | 90.0 | 89.0 | 88.1 | 96.7 | 9.3 |
| 10038221 | 73.9 | 91.6 | 87.1 | 91.1 | 87.2 | 96.4 | 10.1 |
| 10038222 | 71.1 | 87.1 | 74.4 | 83.4 | 86.1 | 90.6 | 10.7 |
| 10038273 | 70.0 | 69.4 | 64.4 | 71.7 | 85.0 | 93.9 | 12.4 |

TABLE 5-5

| Composition Reference | Percent Control on Velvetleaf (ABUTH) | | | | | | Particle size (μm) |
|---|---|---|---|---|---|---|---|
| | 0 Day | 7 Day | 14 Day | 21 Day | 28 Day | 35 Day | |
| UNTREATED | 0.0 | 0.0 | 0.0 | 0.0 | 0.0 | 0.0 | — |
| WARRANT + TRICOR | 57.2 | 58.9 | 77.2 | 38.9 | 10.6 | 13.9 | 10 |
| 10044367-03 | 33.9 | 35.6 | 86.6 | 41.1 | 20.0 | 10.0 | 4.7 |
| 10045210-01 | 9.4 | 41.7 | 90.0 | 33.3 | 19.4 | 13.9 | 9.5 |
| 10045210-02 | 6.1 | 27.8 | 84.2 | 42.8 | 23.3 | 22.8 | 7.9 |
| 10045210-03 | 21.7 | 27.8 | 80.6 | 50.6 | 23.9 | 12.8 | 6.1 |
| 10045210-04 | 95.1 | 91.1 | 93.3 | 46.7 | 43.3 | 12.2 | 2 |
| 10044367 | 32.2 | 48.9 | 93.1 | 61.7 | 56.7 | 17.8 | 5.5 |

TABLE 5-6

| Composition Reference | Percent Control on Proso Millet (PANMI) | | | | | | Particle size (μm) |
|---|---|---|---|---|---|---|---|
| | 0 Day | 7 Day | 14 Day | 21 Day | 28 Day | 35 Day | |
| UNTREATED | 0.0 | 0.0 | 0.0 | 0.0 | 0.0 | 0.0 | — |
| WARRANT + TRICOR | 42.8 | 68.9 | 92.7 | 92.7 | 88.9 | 89.8 | 10 |
| 10044367-03 | 47.2 | 82.6 | 96.2 | 96.3 | 96.9 | 96.4 | 4.7 |
| 10045210-01 | 17.8 | 62.8 | 92.8 | 93.3 | 92.0 | 96.0 | 9.5 |
| 10045210-02 | 20.0 | 56.7 | 93.9 | 92.4 | 89.4 | 91.2 | 7.9 |
| 10045210-03 | 31.1 | 71.4 | 94.8 | 93.9 | 96.3 | 93.7 | 6.1 |
| 10045210-04 | 99.4 | 99.4 | 100.0 | 99.1 | 97.9 | 96.4 | 2 |
| 10044367 | 58.3 | 74.4 | 97.6 | 94.0 | 95.2 | 95.6 | 5.5 |

Example 6

Greenhouse tests were conducted to evaluate pre-emergence weed control on Velvetleaf (ABUTH) and Proso Millet (PANMI) for various herbicidal application mixtures. Application mixtures were prepared from selected concentrate compositions described Example 4. Composition references listed on the tables below indicate the corresponding concentrate composition that was used to prepare the application mixture. Sodium dicamba and sodium acetate were also present in the application mixtures. The mass ratio of acetochlor to sodium dicamba was approximately 2:1. The mass ratio of sodium dicamba to sodium acetate was approximately 4:1. Weed control for the herbicidal application mixtures was compared to that for application mixtures of DEGREE, a microencapsulated acetochlor product available from Monsanto Co., St. Louis, Missouri; TRICOR; and CLARITY, a concentrate containing diglycolamine salt of dicamba that is available from BASF. An application mixture containing metribuzin millbase (non-encapsulated), microencapsulated acetochlor (WARRANT), and sodium dicamba was also prepared (10035668-11) for comparison. The herbicide use rates for these compositions were 1260 g/ha for acetochlor, 280 g/ha for metribuzin, and 560 g/ha for dicamba. The ratio The weed seeds were planted in 3.5-inch square plastic pots filled with a potting media of 50% silt loam soil and 50% Redi-earth (Sun Gro, Bellevue, WA) with 100 g/cu-ft Osmocote 14-14-14 slow release fertilizer. Growth conditions were 28° C. day and 21° C. night with 16 hours of supplemental light (approximately 600 microeinsteins). Overhead irrigation water was applied only as needed to maintain soil moisture. The aqueous herbicidal application mixtures containing the microcapsules were applied to the plants with a track sprayer generally using a Teejet 9501E spray nozzle or similar nozzle with air pressure set at a minimum of 165 kPa. The spray nozzle was 16 inches above the top of the plants and a spray volume rate of about 187 L per hectare was applied.

Tables 6-1, 6-2, 6-3, and 6-4 present the results at seven day intervals. The percent control is average from eight replicates for each composition.

TABLE 6-1

Percent Control on Velvetleaf (ABUTH)

| Composition Reference | 0 Day | 7 Day | 14 Day | 21 Day | 28 Day | 35 Day |
|---|---|---|---|---|---|---|
| 10036519-01 + Na Dicamba | 43.1 | 68.8 | 53.1 | 57.5 | 41.9 | 21.9 |
| 10036519-02 + Na Dicamba | 74.4 | 67.5 | 44.1 | 49.4 | 59.4 | 32.5 |
| 10036519-03 + Na Dicamba | 55.0 | 57.5 | 56.9 | 49.4 | 43.1 | 23.8 |
| 10037436-03 + Na Dicamba | 93.0 | 74.1 | 43.1 | 61.1 | 65.6 | 26.3 |
| 10037439-01 + Na Dicamba | 83.8 | 86.9 | 85.3 | 83.8 | 73.1 | 35.6 |
| 10037439-02 + Na Dicamba | 91.3 | 86.8 | 81.9 | 80.6 | 74.4 | 38.1 |
| 10035668-11 (comparative) | 86.1 | 64.3 | 56.3 | 57.5 | 48.1 | 40.6 |
| DEGREE + TRICOR + CLARITY | 93.4 | 73.1 | 86.9 | 76.0 | 68.8 | 48.8 |

TABLE 6-2

Percent Control on Proso Millet (PANMI)

| Composition Reference | 0 Day | 7 Day | 14 Day | 21 Day | 28 Day | 35 Day |
|---|---|---|---|---|---|---|
| 10036519-01 + Na Dicamba | 73.0 | 94.1 | 97.9 | 97.0 | 98.8 | 96.8 |
| 10036519-02 + Na Dicamba | 79.8 | 86.3 | 97.5 | 96.3 | 100.0 | 98.1 |
| 10036519-03 + Na Dicamba | 69.8 | 71.3 | 88.8 | 89.0 | 90.4 | 88.0 |
| 10037436-03 + Na Dicamba | 99.3 | 83.9 | 99.4 | 99.4 | 97.9 | 98.8 |
| 10037439-01 + Na Dicamba | 100.0 | 98.5 | 100.0 | 99.9 | 100.0 | 100.0 |
| 10037439-02 + Na Dicamba | 100.0 | 99.6 | 99.6 | 100.0 | 99.8 | 100.0 |
| 10035668-11 (comparative) | 94.9 | 86.3 | 92.9 | 98.5 | 96.3 | 97.5 |
| DEGREE + TRICOR + CLARITY | 100.0 | 93.5 | 98.5 | 99.8 | 98.1 | 98.6 |

TABLE 6-3

Percent Control on Velvetleaf (ABUTH)

| Composition Reference | 0 Day | 7 Day | 14 Day | 21 Day | 28 Day | 35 Day |
|---|---|---|---|---|---|---|
| UNTREATED | 0.0 | 0.0 | 0.0 | 0.0 | 0.0 | 0.0 |
| 10040905-01 + Na Dicamba | 99.8 | 95.6 | 93.8 | 75.9 | 47.2 | 43.3 |
| 10040905-02 + Na Dicamba | 95.3 | 93.3 | 84.2 | 58.9 | 37.8 | 56.1 |
| 10040905-03 + Na Dicamba | 95.8 | 93.3 | 87.2 | 60.6 | 81.1 | 78.3 |
| 10040905-04 + Na Dicamba | 94.3 | 95.1 | 80.6 | 72.2 | 47.8 | 45.0 |
| 10040905-05 + Na Dicamba | 96.1 | 95.0 | 84.4 | 82.2 | 62.2 | 60.6 |
| 10036519-03 + Na Dicamba | 94.8 | 92.0 | 84.4 | 56.7 | 62.8 | 52.2 |
| 10035668-11 (comparative) | 85.0 | 97.1 | 62.2 | 84.4 | 81.1 | 80.6 |
| DEGREE + TRICOR + CLARITY | 97.7 | 95.6 | 81.1 | 68.9 | 60.0 | 65.6 |

TABLE 6-4

Percent Control on Proso Millet (PANMI)

| Composition Reference | 0 Day | 7 Day | 14 Day | 21 Day | 28 Day | 35 Day |
|---|---|---|---|---|---|---|
| UNTREATED | 0.0 | 0.0 | 0.0 | 0.0 | 0.0 | 0.0 |
| 10040905-01 + Na Dicamba | 78.9 | 99.8 | 99.2 | 98.8 | 100.0 | 99.3 |
| 10040905-02 + Na Dicamba | 98.6 | 98.9 | 99.8 | 95.9 | 100.0 | 99.2 |
| 10040905-03 + Na Dicamba | 100.0 | 100.0 | 100.0 | 99.7 | 99.9 | 100.0 |
| 10040905-04 + Na Dicamba | 100.0 | 100.0 | 100.0 | 99.9 | 100.0 | 100.0 |
| 10040905-05 + Na Dicamba | 100.0 | 100.0 | 100.0 | 99.8 | 100.0 | 96.1 |
| 10036519-03 + Na Dicamba | 98.8 | 99.3 | 97.4 | 99.8 | 99.8 | 99.4 |
| 10035668-11 (comparative) | 99.3 | 98.9 | 98.8 | 99.7 | 99.8 | 99.6 |
| DEGREE + TRICOR + CLARITY | 97.6 | 99.8 | 99.9 | 99.3 | 99.8 | 96.1 |

Example 7

Greenhouse tests were conducted to evaluate pre-emergence weed control on Waterhemp (AMATA), Green Foxtail (SETVI), Morning Glory (IPOHE), and Goosegrass (ELEIN). Application mixtures were prepared from selected concentrate compositions described Example 4. Composition references listed on the tables below indicate the corresponding concentrate composition that was used to prepare the application mixture. Sodium dicamba and sodium acetate were also present in the application mixtures. The mass ratio of acetochlor to sodium dicamba was approximately 2:1. The mass ratio of sodium dicamba to sodium acetate was approximately 4:1. Weed control for the herbicidal application mixtures was compared to that for application mixtures of (a) DEGREE, TRICOR, and CLARITY and (b) WARRANT, TRICOR, and CLARITY. The herbicide use rates for these compositions were varied as shown on Table 7-1.

The weed seeds were planted in 3.5-inch square plastic pots filled with a potting media of 50% silt loam soil and 50% Redi-earth (Sun Gro, Bellevue, WA) with 100 g/cu-ft Osmocote 14-14-14 slow release fertilizer. Growth conditions were 27° C. day and 21° C. night with 16 hours of supplemental light (approximately 600 microeinsteins). The pots are placed in an environment equipped with sub-irrigation. Overhead irrigation water was also applied as needed to maintain soil moisture. Aqueous herbicidal application mixtures containing the microcapsules were applied to the plants with a track sprayer generally using a Teejet 9501E spray nozzle or similar nozzle with air pressure set at a minimum of 165 kPa. The spray nozzle was 16 inches above the top of the plants and a spray volume rate of about 94 L per hectare was applied.

Table 7-1 presents the results at 14 days after treatment. The percent control is average from 6 replicates for each composition.

sodium acetate was approximately 4:1. ROUNDUP POWERMAX, a potassium glyphosate available from Monsanto Co., was also mixed into some compositions as indicated. Weed control for the herbicidal application mixtures was compared to that for application mixtures of (a) DEGREE, TRICOR, and CLARITY and (b) WARRANT, TRICOR, and CLARITY. The herbicide use rates for these compositions were varied. Use rates for dicamba and glyphosate are provided in grams acid equivalent per hectare.

TABLE 7-1

Pre-Emergence Efficacy

| Composition Reference | Acetochlor Use Rate g/ha | Metribuzin Use Rate g/ha | Dicamba Use Rate g/ha | Waterhemp (AMATA) % control (14 DAT) | Green Foxtail (SETVI) % control (14 DAT) | Morning-glory (IPOHE) % control (14 DAT) | Goosegrass (ELEIN) % control (14 DAT) |
|---|---|---|---|---|---|---|---|
| WARRANT + CLARITY + TRICOR | 840 | 210 | 464 | 98.2 | 82.5 | 28.3 | 98.8 |
| WARRANT + CLARITY + TRICOR | 1260 | 280 | 618 | 98.0 | 91.8 | 45.0 | 98.7 |
| DEGREE CLARITY TRICOR | 840 | 210 | 464 | 99.8 | 89.2 | 43.3 | 100.0 |
| DEGREE CLARITY TRICOR | 1260 | 280 | 618 | 99.7 | 99.3 | 58.3 | 100.0 |
| 10036519-01 + Na Dicamba | 840 | 210 | 464 | 99.7 | 85.8 | 38.3 | 100.0 |
| 10036519-01 + Na Dicamba | 1260 | 280 | 618 | 97.7 | 98.4 | 46.7 | 100.0 |
| 10036519-02 + Na Dicamba | 840 | 210 | 464 | 83.8 | 90.8 | 33.3 | 100.0 |
| 10036519-02 + Na Dicamba | 1260 | 280 | 618 | 91.7 | 92.2 | 38.3 | 100.0 |
| 10036519-03 + Na Dicamba | 840 | 210 | 464 | 90.0 | 65.0 | 28.3 | 100.0 |
| 10036519-03 + Na Dicamba | 1260 | 280 | 618 | 94.2 | 78.6 | 38.3 | 100.0 |
| 10037436-03 + Na Dicamba | 840 | 210 | 464 | 95.8 | 96.3 | 30.0 | 100.0 |
| 10037436-03 | 1260 | 280 | 618 | 95.8 | 82.0 | 43.3 | 100.0 |
| 10035668-11 (comparative) | 840 | 210 | 464 | 97.7 | 63.3 | 28.3 | 100.0 |
| 10035668-11 (comparative) | 1260 | 280 | 618 | 88.3 | 67.3 | 51.7 | 100.0 |
| 10035690-04 | 840 | 210 | — | 67.3 | 85.8 | 10.8 | 100.0 |
| 10035690-04 | 1260 | 280 | — | 83.8 | 33.0 | 9.2 | 100.0 |
| 10037439-01 + Na Dicamba | 840 | 210 | 464 | 99.5 | 94.3 | 36.7 | 100.0 |
| 10037439-01 | 1260 | 280 | 618 | 99.8 | 98.6 | 72.5 | 100.0 |
| 10037439-02 + Na Dicamba | 840 | 210 | 464 | 99.8 | 96.7 | 36.7 | 100.0 |
| 10037439-02 + Na Dicamba | 1260 | 280 | 618 | 99.8 | 100.0 | 66.7 | 100.0 |
| UNTREATED | — | — | — | 0.0 | 0.0 | 0.0 | 0.0 |

Example 8

Greenhouse tests were conducted to evaluate post-emergence weed control on Velvetleaf (ABUTH) and Goosegrass (ELEIN). Application mixtures were prepared from selected concentrate compositions described Example 4. Composition references listed on the tables below indicate the corresponding concentrate composition that was used to prepare the application mixture. Sodium dicamba and sodium acetate were also present in the application mixtures. The mass ratio of acetochlor to sodium dicamba was approximately 2:1. The mass ratio of sodium dicamba to The weed seeds were planted in 3.5-inch square plastic pots filled with a potting media of Redi-earth (Sun Gro, Bellevue, WA) with 100 g/cu-ft Osmocote 14-14-14 slow release fertilizer. Growth conditions were 27° C. day and 21° C. night with 16 hours of supplemental light (approximately 600 microeinsteins). The pots are placed in an environment equipped with sub-irrigation. The aqueous herbicidal application mixtures containing the microcapsules were applied to the plants with a track sprayer generally using a Teejet 110015 spray nozzle or similar nozzle with air pressure set at a minimum of 165 kPa. The spray nozzle was 16 inches above the top of the plants and a spray volume rate of about 141 L per hectare was applied.

Table 8-1 presents the results at 21 days after treatment. The percent control is average from six replicates for each composition.

TABLE 8-1

| | Post-Emergent Efficacy | | | | | |
|---|---|---|---|---|---|---|
| Composition Reference | Acetochlor Use Rate g/ha | Metribuzin Use Rate g/ha | Dicamba Use Rate g/ha | Glyphosate Use Rate g/ha | Velvetleaf (ABUTH) % control (21 DAT) | Goosegrass (ELEIN) % control (21 DAT) |
| WARRANT + CLARITY + TRICOR | 840 | 210 | 420 | — | 72.5 | 0.0 |
| WARRANT + CLARITY + TRICOR | 1260 | 280 | 560 | — | 82.5 | 11.7 |
| DEGREE + CLARITY + TRICOR | 840 | 210 | 420 | — | 75.0 | 0.0 |
| DEGREE + CLARITY + TRICOR | 1260 | 280 | 560 | — | 77.5 | 18.3 |
| ROUNDUP POWERMAX + WARRANT + CLARITY + TRICOR | 840 | 210 | 420 | 840 | 65.8 | 75.0 |
| ROUNDUP POWERMAX + WARRANT + CLARITY + TRICOR | 1260 | 280 | 560 | 1120 | 77.5 | 75.0 |
| ROUNDUP POWERMAX + DEGREE + CLARITY + TRICOR | 840 | 210 | 464 | 840 | 75.8 | 75.0 |
| ROUNDUP POWERMAX + DEGREE + CLARITY + TRICOR | 1260 | 280 | 618 | 1120 | 84.2 | 75.0 |
| 10036519-01 + Na Dicamba | 840 | 210 | 464 | — | 41.7 | 12.5 |
| 10036519-01 + Na Dicamba | 1260 | 280 | 618 | — | 60.0 | 17.5 |
| 10036519-02 + Na Dicamba | 840 | 210 | 464 | — | 41.7 | 16.7 |
| 10036519-02 + Na Dicamba | 1260 | 280 | 618 | — | 60.8 | 26.7 |
| 10036519-03 + Na Dicamba | 840 | 210 | 464 | — | 40.0 | 14.2 |
| 10036519-03 + Na Dicamba | 1260 | 280 | 618 | — | 53.3 | 24.2 |
| 10037436-03 + Na Dicamba | 840 | 210 | 464 | — | 41.7 | 22.5 |
| 10037436-03 + Na Dicamba | 1260 | 280 | 618 | — | 60.0 | 18.3 |
| 10035668-11 (comparative) | 840 | 210 | 464 | — | 35.0 | 22.5 |
| 10035668-11 (comparative) | 1260 | 280 | 618 | — | 55.8 | 24.2 |
| 10035690-04 + Na Dicamba | 840 | 210 | 464 | — | 20.8 | 15.8 |
| 10035690-04 + Na Dicamba | 1260 | 280 | 618 | — | 35.0 | 31.7 |
| 10037439-01 + Na Dicamba | 840 | 210 | 464 | — | 51.7 | 51.7 |
| 10037439-01 + Na Dicamba | 1260 | 280 | 618 | — | 68.3 | 55.0 |
| 10037439-02 + Na Dicamba | 840 | 210 | 464 | — | 50.0 | 55.0 |
| 10037439-02 + Na Dicamba | 1260 | 280 | 618 | — | 60.8 | 59.2 |

TABLE 8-1-continued

Post-Emergent Efficacy

| Composition Reference | Acetochlor Use Rate g/ha | Metribuzin Use Rate g/ha | Dicamba Use Rate g/ha | Glyphosate Use Rate g/ha | Velvetleaf (ABUTH) % control (21 DAT) | Goosegrass (ELEIN) % control (21 DAT) |
|---|---|---|---|---|---|---|
| ROUNDUP POWERMAX + 10036519-01 | 840 | 210 | 464 | 840 | 53.3 | 75.0 |
| ROUNDUP POWERMAX + 10036519-01 + Na Dicamba | 1260 | 280 | 618 | 1120 | 61.7 | 75.0 |
| ROUNDUP POWERMAX + 10036519-02 + Na Dicamba | 840 | 210 | 464 | 840 | 53.3 | 76.7 |
| ROUNDUP POWERMAX + 10036519-02 + Na Dicamba | 1260 | 280 | 618 | 1120 | 68.3 | 76.7 |
| ROUNDUP POWERMAX + 10036519-03 + Na Dicamba | 840 | 210 | 464 | 840 | 51.7 | 76.7 |
| ROUNDUP POWERMAX + 10036519-03 + Na Dicamba | 1260 | 280 | 618 | 1120 | 67.5 | 77.5 |
| ROUNDUP POWERMAX + 10037436-03 + Na Dicamba | 840 | 210 | 464 | 840 | 61.7 | 76.7 |
| ROUNDUP POWERMAX + 10037436-03 + Na Dicamba | 1260 | 280 | 618 | 1120 | 70.8 | 75.8 |
| ROUNDUP POWERMAX + 10035668-11 (comparative) | 840 | 210 | 464 | 840 | 60.0 | 77.5 |
| ROUNDUP POWERMAX + 10035668-11 (comparative) | 1260 | 280 | 618 | 1120 | 70.8 | 75.0 |
| ROUNDUP POWERMAX + 10035690-04 + Na Dicamba | 840 | 210 | 464 | 840 | 75.0 | 80.0 |
| ROUNDUP POWERMAX + 10035690-04 + Na Dicamba | 1260 | 280 | 618 | 1120 | 80.8 | 80.0 |
| ROUNDUP POWERMAX + 10037439-01 + Na Dicamba | 840 | 210 | 464 | 840 | 65.8 | 65.0 |
| ROUNDUP POWERMAX + 10037439-01 + Na Dicamba | 1260 | 280 | 618 | 1120 | 78.3 | 70.0 |
| ROUNDUP POWERMAX + 10037439-02 + Na Dicamba | 840 | 210 | 464 | 840 | 61.7 | 62.5 |
| ROUNDUP POWERMAX + 10037439-02 + Na Dicamba | 1260 | 280 | 618 | 1120 | 81.7 | 70.0 |
| UNTREATED | — | — | — | — | 0.0 | 0.0 |

Example 9

Greenhouse tests were conducted to evaluate soybean crop safety for pre-emergence application for herbicidal application mixtures prepared from selected concentrates of herbicidal microcapsules of Example 1. Composition references listed on the tables below indicate the corresponding concentrate composition that was used to prepare the application mixture. Crop injury for the herbicidal application mixtures was compared to that for application mixtures of containing WARRANT with TRICOR. The herbicide use rates for these compositions were 1260 g/ha or 2520 g/ha for acetochlor and 280 g/ha or 560 g/ha for metribuzin.

The soybean seeds that were planted were Asgrow AG5935, which is a soybean variety that is sensitive to metribuzin. The soybean seeds were planted in 3.5-inch square plastic pots filled with a potting media of 75% silt loam and 25% Redi-earth (Sun Gro, Bellevue, WA). The temperature conditions were 22° C. day and 17° C. night with 14 hours of supplemental light (approximately 600 microeinsteins). The pots are placed in an environment equipped with sub-irrigation. Overhead irrigation water was also applied as needed to maintain soil moisture. The aqueous herbicidal application mixtures containing the microcapsules were applied to the plants with a track sprayer generally using a Teejet 9501 spray nozzle or similar nozzle with air pressure set at a minimum of 165 kPa. The spray nozzle was 16 inches above the top of the plants and a spray volume rate of about 94 L per hectare was applied.

Table 9-1 presents the crop injury results at 23 days after treatment. The percent crop injury is an average from six replicates for each composition.

TABLE 9-1

| Composition Reference | Pre-Emergent Application % Crop Injury at 23 DAT Metribuzin Sensitive Soybean Variety: AG5935 | |
|---|---|---|
| | 1260 + 280 g ai/ha | 2520 + 560 g ai/ha |
| WARRANT + TRICOR | 79 | 77 |
| 10044367-03 | 5 | 0 |
| 10045210-01 | 0 | 0 |
| 10045210-02 | 0 | 0 |
| 10045210-03 | 0 | 17 |
| 10045210-04 | 50 | 62 |
| 10044367 | 0 | 0 |
| UNTREATED | 0 | 0 |

Example 10

Greenhouse tests were conducted to evaluate soybean crop safety for post-emergence application for herbicidal compositions prepared from selected concentrates of herbicidal microcapsules of Example 1. Composition references listed on the tables below indicate the corresponding concentrate composition that was used to prepare the application mixture. Crop injury for the herbicidal compositions was compared to that for application mixtures of containing (a) DEGREE, (b) WARRANT, and (c) WARRANT with TRICOR. The herbicide use rates for these compositions were 810 g/ha, 1008 g/ha, or 1260 g/ha for acetochlor and 180 g/ha, 224 g/ha, or 280 g/ha for metribuzin The soybean seeds that were planted were Asgrow AG5935, which is a soybean variety that is sensitive to metribuzin and Asgrow AG4232, which is a soybean variety that is moderately tolerant to metribuzin. The soybean seeds were planted in 3.5-inch square plastic pots filled with a potting media of 75% silt loam and 25% Redi-earth (Sun Gro, Bellevue, WA). The temperature conditions were 22° C. day and 17° C. night with 14 hours of supplemental light (approximately 600 microeinsteins). The pots are placed in an environment equipped with sub-irrigation. Overhead irrigation water was also applied as needed to maintain soil moisture. The aqueous herbicidal application mixtures containing the microcapsules were applied to the plants with a track sprayer generally using a Teejet 9501 spray nozzle or similar nozzle with air pressure set at a minimum of 165 kPa. The spray nozzle was 16 inches above the top of the plants and a spray volume rate of about 94 L per hectare was applied. The plants were sprayed at the V2-V3 growth stage.

Table 10-1 presents the crop injury results at 10 days after treatment. The percent crop injury is an average from six replicates for each composition.

TABLE 10-1

| | Post-Emergent Application % Crop Injury at 10 DAT | | | | | |
|---|---|---|---|---|---|---|
| | Metribuzin Sensitive Variety: AG5935 | | | Metribuzin Moderately Tolerant Variety: AG4232 | | |
| Composition Reference | 810 + 180 g ai/ha | 1008 + 224 g ai/ha | 1260 + 280 g ai/ha | 810 + 180 g ai/ha | 1008 + 224 g ai/ha | 1260 + 280 g ai/ha |
| WARRANT + TRICOR | 66 | 64 | 78 | 54 | 47 | 47 |
| 10045210-01 | 33 | 37 | 30 | 10 | 17 | 18 |
| 10045210-02 | 33 | 33 | 29 | 3 | 14 | 15 |
| 10045210-03 | 30 | 30 | 34 | 13 | 15 | 18 |
| 10044367 | 37 | 44 | 30 | 16 | 26 | 23 |
| UNTREATED | 0 | 0 | 0 | 0 | 0 | 0 |

Example 11

Additional greenhouse tests were conducted to evaluate soybean crop safety for post-emergence application for herbicidal application mixtures prepared from selected herbicidal microcapsules of Example 1. Composition references listed on the tables below indicate the corresponding concentrate composition that was used to prepare the application mixture. Crop injury for the herbicidal application mixtures was compared to that for application mixtures of containing (a) TRICOR, (b) WARRANT, and (c) WARRANT with TRICOR. The herbicide use rates for these compositions were varied.

The soybean seeds that were planted were (a) Asgrow AG6534, which is a soybean variety that is sensitive to metribuzin, (b) RX3601, which is a soybean variety that is moderately tolerant to metribuzin, (c) RX3801, which is a soybean variety that is moderately tolerant to metribuzin, and (d) RX4301, which is a soybean variety that is tolerant to metribuzin. The soybean seeds were planted in 3.5-inch square plastic pots filled with a potting media of 75% silt loam and 25% Redi-earth (Sun Gro, Bellevue, WA). The temperature conditions were 22° C. day and 17° C. night with 14 hours of supplemental light (approximately 600 microeinsteins). The pots are placed in an environment equipped with sub-irrigation. Overhead irrigation water was also applied as needed to maintain soil moisture. The aqueous herbicidal application mixtures containing the microcapsules were applied to the plants with a track sprayer generally using a Teejet 9501 spray nozzle or similar nozzle with air pressure set at a minimum of 165 kPa. The spray nozzle was 16 inches above the top of the plants and a spray volume rate of about 94 L per hectare was applied. The plants were sprayed at the V2-V3 growth stage.

Tables 11-1 and 11-2 present the crop injury results.

TABLE 11-1

| | Post-Emergent Application on Metribuzin Sensitive Variety: AG6534 | | |
|---|---|---|---|
| Composition Reference | Acetochlor Use Rate g ai/ha | Metribuzin Use Rate g ai/ha | % Crop Injury at 11 DAT |
| TRICOR DF (metribuzin) | — | 280 | 83.33 |
| TRICOR DF | — | 560 | 93.83 |
| TRICOR DF | — | 1120 | 99.5 |
| WARRANT (acetochlor) | 1260 | — | 20 |
| WARRANT | 2520 | — | 15 |
| WARRANT | 3780 | — | 28.33 |
| WARRANT + TRICOR | 1260 | 280 | 85.83 |
| WARRANT + TRICOR | 2520 | 560 | 96.67 |
| WARRANT + TRICOR | 3780 | 1120 | 94.83 |
| 10035690-02 | 1260 | 280 | 25 |
| 10035690-02 | 2520 | 560 | 60.83 |
| 10035690-02 | 3780 | 1120 | 75.83 |
| 10035690-04 | 1260 | 280 | 42.5 |
| 10035690-04 | 2520 | 560 | 45.83 |
| 10035690-04 | 3780 | 1120 | 63.33 |
| 10035690-05 | 1260 | 280 | 40.83 |
| 10035690-05 | 2520 | 560 | 49.17 |
| 10035690-05 | 3780 | 1120 | 65 |
| 10035690-05-1 | 1260 | 280 | 45 |
| 10035690-05-1 | 2520 | 560 | 53.33 |
| 10035690-05-1 | 3780 | 1120 | 43.33 |
| 10035690-06 | 1260 | 280 | 78.33 |
| 10035690-06 | 2520 | 560 | 93.33 |
| 10035690-06 | 3780 | 1120 | 90.83 |
| 10036080-2 | 1260 | 280 | 65.83 |
| 10036080-2 | 2520 | 560 | 88.83 |
| 10036080-2 | 3780 | 1120 | 74.17 |

Example 12

Greenhouse tests were conducted to evaluate corn crop safety for post-emergence application for herbicidal application mixtures prepared from selected herbicidal microcapsules of Example 1. Composition references listed on the tables below indicate the corresponding concentrate composition that was used to prepare the application mixture. Crop injury for the herbicidal application mixtures was compared to that for application mixtures of containing TRICOR. The herbicide use rates for these compositions were varied.

The corn seeds that were planted were DKC65-17RR. The seeds were planted in 3.5-inch square plastic pots filled with a potting media of 75% silt loam and 25% Redi-earth (Sun Gro, Bellevue, WA). The temperature conditions were 22° C. day and 17° C. night with 14 hours of supplemental light (approximately 600 microeinsteins). The pots are placed in an environment equipped with sub-irrigation. Overhead irrigation water was also applied as needed to maintain soil moisture. The aqueous herbicidal application mixtures containing the microcapsules were applied to the plants with a track sprayer generally using a Teejet 9501 spray nozzle or similar nozzle with air pressure set at a minimum of 165 kPa. The spray nozzle was 16 inches above the top of the plants and a spray volume rate of about 94 L per hectare was applied.

TABLE 11-2

| | | | Post-Emergent Application % Crop Injury at 10 DAT | | | |
|---|---|---|---|---|---|---|
| Composition Reference | Acetochlor Use Rate g ai/ha | Metribuzin Use Rate g ai/ha | Metribuzin Sensitive Variety: AG6534 | Metribuzin Moderately Tolerant Variety: RX3601 | Metribuzin Moderately Tolerant Variety: RX3801 | Metribuzin Tolerant Variety: RX4301 |
| WARRANT + TRICOR | 1260 | 280 | 80.0 | 77.5 | 79.17 | 80.83 |
| WARRANT + TRICOR | 2520 | 560 | 87.5 | 86.67 | 81.67 | 85 |
| WARRANT + TRICOR | 3780 | 1120 | 93.33 | 86.67 | 79.17 | 87.5 |
| 10035690-02 | 1260 | 280 | 51.67 | 6.67 | 61.67 | 16.67 |
| 10035690-02 | 2520 | 560 | 48.33 | 30 | 50.83 | 14.17 |
| 10035690-02 | 3780 | 1120 | 56.67 | 30 | 63.33 | 35 |
| 10035690-06 | 1260 | 280 | 33.33 | 10.83 | 35 | 6.67 |
| 10035690-06 | 2520 | 560 | 46.67 | 36.67 | 45 | 25.83 |
| 10035690-06 | 3780 | 1120 | 53.33 | 48.33 | 61.67 | 51.67 |

Table 12-1 presents the crop injury results.

TABLE 12-1

Post-Emergent Application
% Crop Injury at 14 DAT
Corn Variety: DKC65-17RR

| Composition Reference | Acetochlor Use Rate g ai/ha | Metribuzin Use Rate g ai/ha | % Crop Injury at 11 DAT |
|---|---|---|---|
| TRICOR | — | 280 | 3.33 |
| TRICOR | — | 560 | 23.33 |
| TRICOR | — | 1120 | 53.33 |
| 10035690-02 | 1260 | 280 | 6.67 |
| 10035690-02 | 2520 | 560 | 0 |
| 10035690-02 | 3780 | 1120 | 10.83 |

TABLE 12-1-continued

Post-Emergent Application
% Crop Injury at 14 DAT
Corn Variety: DKC65-17RR

| Composition Reference | Acetochlor Use Rate g ai/ha | Metribuzin Use Rate g ai/ha | % Crop Injury at 11 DAT |
|---|---|---|---|
| 10035690-04 | 1260 | 280 | 7.5 |
| 10035690-04 | 2520 | 560 | 0 |
| 10035690-04 | 3780 | 1120 | 0 |
| 10035690-05 | 1260 | 280 | 0 |
| 10035690-05 | 2520 | 560 | 0 |
| 10035690-05 | 3780 | 1120 | 0 |
| 10035690-05-1 | 1260 | 280 | 0 |
| 10035690-05-1 | 2520 | 560 | 0 |
| 10035690-05-1 | 3780 | 1120 | 0 |
| 10035690-06 | 1260 | 280 | 0 |
| 10035690-06 | 2520 | 560 | 0 |
| 10035690-06 | 3780 | 1120 | 0 |
| 10036080-2 | 1260 | 280 | 2.5 |
| 10036080-2 | 2520 | 560 | 6.67 |
| 10036080-2 | 3780 | 1120 | 11.67 |

Example 13

A series of field trials was conducted to evaluate pre-emergence weed control of a variety of broadleaf and narrowleaf weeds. Application mixtures were prepared from selected concentrate compositions described in Example 3. Composition references listed on the tables below indicate the corresponding concentrate composition that was used to prepare the application mixture. Sodium dicamba was also present in one of the application mixtures as indicated.

The weed seeds were planted in 6.67 feet by 20 feet plots filled. The aqueous herbicidal application mixtures containing the microcapsules were applied to the plants with a sprayer generally using a Teejet 110015 spray nozzle or similar nozzle. A spray volume rate of between about 15 gallons per acre was applied. The broadleaf weeds consisted of Velvetleaf (ABUTH) in 5 trials; Waterhemp (AMATA/AMATG) in 4 trials, Common Lambsquarter (CHEAL) in 1 trial, Venice Mallow (HIBTR) in 1 trial, Morning Glory (IPOHE) in 3 trials, Common Purslane (POROL) in 1 trial, Prickly Sida (SIDSP) in 1 trial, and *Sesbania exaltata* (SEBEX) in 1 trial. The narrowleaf weeds consisted of Barnyard Grass (ECHCG) in 4 trials, Large Crabgrass (DIGSA) in 3 trials, Proso Millet (PANMI) in 2 trials, Browntop Millet (PANRA) in 1 trial, Broadleaf Signalgrass (BRAPP) in 2 trials, Southern Sandbur (CCHEC) in 1 trial, Giant Foxtail (SETFA) in 3 trials, and Johnsongrass (SORHA) in 1 trial. The percent control is calculated as an average among these trials. Table 13-1 presents the results for these tests.

TABLE 13-1

| Composition Reference | Acetochlor Use Rate (lb/A) | Metribuzin Use Rate (lb/A) | Dicamba Use Rate (lb a.i./A) | % Broadleaf Control 28 DAT | % Narrowleaf Control 28 DAT |
|---|---|---|---|---|---|
| 10036080-2 | 2 | 0.2 | — | 90 | 92 |
| 10037792 + Na Dicamba | 2 | 0.2 | 0.44 | 94 | 93 |

A second series of field trials was conducted to evaluate pre-emergence weed control a variety of broadleaf and narrowleaf weeds. Application mixtures were prepared from selected concentrate compositions described in Examples 1 and 4. Composition references listed on the tables below indicate the corresponding concentrate composition that was used to prepare the application mixture. Sodium dicamba and sodium acetate were also present in the application mixtures. The mass ratio of acetochlor to sodium dicamba was approximately 2:1. The mass ratio of sodium dicamba to sodium acetate was approximately 4:1.

The weed seeds were planted in 6.67 feet by 20 feet plots filled. The aqueous herbicidal application mixtures containing the microcapsules were applied to the plants with a sprayer generally using a Teejet 110015 spray nozzle or similar nozzle. A spray volume rate of between about 15 gallons per acre was applied. The broadleaf weeds consisted of Velvetleaf (ABUTH) in 5 trials; Waterhemp/glyphosate-resistant waterhemp (AMATA/AMATG) in 3 trials, glyphosate-resistant *Palmer amaranth* (AMAPG) in 7 trials, beggarweed (DEDTO) in 1 trial, Venice Mallow (HIBTR) in 1 trial, Morning Glory (IPOHE) in 5 trials, Carpetweed (MOLVE), Common Purslane (POROL) in 1 trial, Prickly Sida (SIDSP) in 2 trials, and *Sesbania exaltata* (SEBEX) in 1 trial. The narrowleaf weeds consisted of Crowfootgrass (DTTAE) in 1 trial, Broadleaf Signalgrass (BRAPP) in 2 trials, Southern Sandbur (CCHEC) in 1 trial, Large Crabgrass (DIGSA) in 3 trials, Barnyard Grass (ECHCG) in 4 trials, and Goosegrass (ELEIN) in 1 trial. The percent control is calculated as an average among these trials. Table 13-2 presents the results for these tests.

TABLE 13-2

| Composition Reference | Acetochlor Use Rate (lb/A) | Metribuzin Use Rate (lb/A) | Dicamba Use Rate (lb a.e./A) | % Broadleaf Control 28 DAT | % Narrowleaf Control 28 DAT |
|---|---|---|---|---|---|
| 10035690-02 | 1.125 | 0.25 | — | 88 | 94 |
| 10036519-03 + Na Dicamba | 1.125 | 0.25 | 0.5 | 96 | 94 |

EMBODIMENTS

For further illustration, additional non-limiting embodiments of the present disclosure are set forth below.

For example, Embodiment A1 is a herbicidal microcapsule comprising:

a core material comprising an acetamide herbicide and a second herbicide, wherein at least a portion of the second herbicide is dissolved in the acetamide herbicide and wherein the weight ratio of the acetamide herbicide to the second herbicide in the core material is at least about 2:1; and a shell wall encapsulating the core material, wherein the shell wall comprises a polyurea.

Embodiment A2 is the herbicidal microcapsule of embodiment A1 wherein the acetamide herbicide comprises at least one herbicide selected from the group consisting of acetochlor, alachlor, butachlor, butenachlor, delachlor, diethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof.

Embodiment A3 is the herbicidal microcapsule of embodiment A1 or A2 wherein the acetamide herbicide comprises at least one chloroacetanilide herbicide selected from the group consisting of acetochlor, alachlor, butachlor, butenachlor, delachlor, diethatyl, dimethachlor, metazochlor, metolachlor, S-metolachlor, pretilachlor, propachlor, propisochlor, prynachlor, terbuchlor, thenylchlor and xylachlor, stereoisomers thereof, and mixtures thereof.

Embodiment A4 is the herbicidal microcapsule of any one of embodiments A1 to A3 wherein the acetamide herbicide comprises at least one chloroacetanilide herbicide selected from the group consisting of the group consisting of acetochlor, alachlor, butachlor, metolachlor, S-metolachlor, stereoisomers thereof, and mixtures thereof.

Embodiment A5 is the herbicidal microcapsule of any one of embodiments A1 to A4 wherein the acetamide herbicide comprises acetochlor.

Embodiment A6 is the herbicidal microcapsule of any one of embodiments A1 to A5 wherein the second herbicide has a water solubility no greater than 0.4 wt. %, no greater than about 0.2 wt. %, or no greater than about 0.1 wt. %.

Embodiment A7 is the herbicidal microcapsule of any one of embodiments A1 to A6 wherein the second herbicide has a solubility in an organic solvent that is at least about 1 wt. %, at least about 2 wt. %, or at least about 5 wt. %.

Embodiment A8 is the herbicidal microcapsule of any one of embodiments A1 to A7 wherein the second herbicide comprises a photosystem II (PS II) inhibitor.

Embodiment A9 is the herbicidal microcapsule of any one of embodiments A1 to A8 wherein the second herbicide comprises at least one PS II inhibitor selected from the group consisting of ametryn, atrazine, bentazon, bromacil, bromoxynil, chlorotoluron, cyanazine, desmedipham, desmetryn, dimefuron, diuron, fluometuron, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, esters thereof, and mixtures thereof.

Embodiment A10 is the herbicidal microcapsule of any one of embodiments A1 to A9 wherein the second herbicide comprises metribuzin.

Embodiment A11 is the herbicidal microcapsule of any one of embodiments A1 to A10 wherein the second herbicide comprises a hydroxyphenylpyruvate dioxygenase (HPPD) inhibitor.

Embodiment A12 is the herbicidal microcapsule of any one of embodiments A1 to A11 wherein the second herbicide comprises at least one HPPD inhibitor selected from the group consisting of aclonifen, beflubutamid, benzofenap, clomazone, diflufenican, fluridone, flurochloridone, flurtamone, isoxachlortole, isoxaflutole, norflurazon, picolinafen, pyrazolynate, pyrazoxyfen, sulcotrione, tembotrione and topramezone, esters thereof, and mixtures thereof Embodiment A13 is the herbicidal microcapsule of any one of embodiments A1 to A12 wherein the second herbicide comprises a protoporphyrinogen oxidase (PPO) inhibitor.

Embodiment A14 is the herbicidal microcapsule of any one of embodiments A1 to A13 wherein the second herbicide comprises at least one PPO inhibitor selected from the group consisting of acifluorfen, azafenidin, bifenox, butafenacil, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufenethyl, saflufenacil, sulfentrazone, ethyl 2-((3-(2-chloro-4-fluoro-5-(3-methyl-2,6-dioxo-4-(trifluoromethyl)-3,6-dihydropyrimidin-1(2H)-yl)phenoxy)pyridin-2-yl)oxy)acetate, esters thereof, and mixtures thereof.

Embodiment A15 is the herbicidal microcapsule of any one of embodiments A1 to A14 wherein the second herbicide comprises at least one herbicide selected from the group consisting of primisulfuron, imazosufuron, foramsulfuron, imazethapyr, halosufluron, quizalofop-P, fluazifop-P, ethalfuralin, napropamide, S-metolachlor, pronamide, alachlor, dimethenamid-p, bensulide, pendimethalin, oryzalin, trifluralin, pyroxasulfone, EPTC, ethofumesate, cycloate, 2,4-dichlorophenoxyacetic acid, triclopyr, quinclorac, fluroxypyr, clopyralid, norflurazon, esters thereof, and mixtures thereof.

Embodiment A16 is the herbicidal microcapsule of any one of embodiments A1 to A15 wherein the weight ratio of the acetamide herbicide to the second herbicide in the core material is at least about 3:1, at least about 4:1, at least about 5:1, at least about 9:1, at least about 10:1, at least about 25:1, at least about 50:1, at least about 100:1, or at least about 200:1.

Embodiment A17 is the herbicidal microcapsule of any one of embodiments A1 to A16 wherein the weight ratio of the acetamide herbicide to the second herbicide in the core material is from about 2:1 to about 300:1, from about 2:1 to about 200:1, from about 2:1 to about 100:1, 2:1 to about 50:1, from about 2:1 to about 25:1, from about 2:1 to about 10:1, from about 2:1 to about 9:1, from about 2:1 to about 5:1, from about 2:1 to about 4:1, from about 2:1 to about 3:1, from about 3:1 to about 300:1, from about 3:1 to about 200:1, from about 3:1 to about 100:1, 3:1 to about 50:1, from about 3:1 to about 25:1, from about 3:1 to about 10:1, from about 3:1 to about 9:1, from about 3:1 to about 5:1, from about 3:1 to about 4:1, from about 4:1 to about 300:1, from about 4:1 to about 200:1, from about 4:1 to about 100:1, 4:1 to about 50:1, from about 4:1 to about 25:1, from about 4:1 to about 10:1, from about 4:1 to about 9:1, or from about 4:1 to about 5:1.

Embodiment A18 is the herbicidal microcapsule of any one of embodiments A1 to A17 wherein the second herbicide is metribuzin and the weight ratio of the acetamide herbicide to metribuzin in the core material is from about 2:1 to about 10:1, from about 3:1 to about 10:1, from about 4:1 to about 10:1, from about 2:1 to about 8:1, from about 3:1 to about 8:1, from about 4:1 to about 10:1, from about 2:1 to about 5:1, from about 3:1 to about 5:1, or from about 4:1 to about 5:1.

Embodiment A19 is the herbicidal microcapsule of any one of embodiments A1 to A18 wherein the second herbicide is metribuzin and the weight ratio of the acetamide herbicide to metribuzin in the core material is such that the amount of metribuzin is less than the solubility limit of metribuzin in the acetamide herbicide at 25° C.

Embodiment A20 is the herbicidal microcapsule of any one of embodiments A1 to A19 wherein at least about 20 wt. %, at least about 30 wt. %, at least about 40 wt. %, at least about 50 wt. %, at least about 60 wt. %, at least about 70 wt. %, at least about 80 wt. %, at least about 90 wt. %, or at least about 95 wt. % of the total amount of second herbicide is dissolved in the acetamide herbicide.

Embodiment A21 is the herbicidal microcapsule of any one of embodiments A1 to A20 wherein from about 20 wt. % to about 99 wt. %, from about 30 wt. % to about 99 wt. %, from about 40 wt. % to about 99 wt. %, from about 50 wt. % to about 99 wt. %, from about 60 wt. % to about 99 wt. %, from about 70 wt. % to about 99 wt. %, from about 80 wt. % to about 99 wt. %, from about 90 wt. % to about 99 wt. %, from about 20 wt. % to about 95 wt. %, from about 30 wt. % to about 95 wt. %, from about 40 wt. % to about 95 wt. %, from about 50 wt. % to about 95 wt. %, from about 60 wt. % to about 95 wt. %, from about 70 wt. % to about 95 wt. %, from about 80 wt. % to about 95 wt. %, from about 90 wt. % to about 95 wt. %, from about 20 wt. % to about 90 wt. %, from about 30 wt. % to about 90 wt. %, from about 40 wt. % to about 90 wt. %, from about 50 wt. % to about 90 wt. %, from about 60 wt. % to about 90 wt. %, from about 70 wt. % to about 90 wt. %, or from about 80 wt. % to about 90 wt. % of the total amount of second herbicide is dissolved in the acetamide herbicide.

Embodiment A22 is the herbicidal microcapsule of any one of embodiments A1 to A21 wherein the acetamide herbicide constitutes at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % of the microcapsule.

Embodiment A23 is the herbicidal microcapsule of any one of embodiments A1 to A22 wherein the acetamide herbicide constitutes from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. % of the microcapsule.

Embodiment A24 is the herbicidal microcapsule of any one of embodiments A1 to A23 wherein the core material further comprises a safener.

Embodiment A25 is the herbicidal microcapsule of embodiment A24 wherein the safener is selected from the group consisting of furilazole ((RS)-3 (dichloroacetyl) 5 (2 furanyl) 2,2 dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy) acetic acid); cyometrinil ((Z)-cyanomethoxyimino(phenyl) acetonitrile); cyprosulfamide (N-[4-(cyclopropylcarbamoyl) phenylsulfonyl]-o-anisamide); dichlormid (N,N-diallyl-2,2-dichloroacetamide); dicyclonon ((RS)-1-dichloroacetyl-3,3, 8a-trimethylperhydropyrrolo[1,2-a]pyrimidin-6-one); dietholate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino(phenyl)acetonitrile); isoxadifen (4,5-dihydro-5,5-diphenyl-1,2-oxazole-3-carboxylic acid); cyprosulfamide; salts and esters thereof, and mixtures thereof.

Embodiment A26 is the herbicidal microcapsule of any one of embodiments A1 to A25 wherein the core material further comprises a diluent.

Embodiment A27 is the herbicidal microcapsule of any one of embodiments A1 to A26 wherein the shell wall is formed in a polymerization medium by a polymerization reaction between a polyisocyanate component comprising a polyisocyanate or mixture of polyisocyanates and a polyamine component comprising a polyamine or mixture of polyamines to form the polyurea.

Embodiment A28 is the herbicidal microcapsule of embodiment A27 wherein the polyisocyanate component comprises an aliphatic polyisocyanate.

Embodiment A29 is the herbicidal microcapsule of embodiment A27 or A28 wherein the polyamine component comprises a polyamine of the structure $NH_2(CH_2CH_2NH)mCH_2CH_2NH_2$ where m is from 1 to 5, 1 to 3, or 2.

Embodiment A30 is the herbicidal microcapsule of any one of embodiments A27 to A29 wherein the ratio of amine molar equivalents contained in the polyamine component to isocyanate molar equivalents contained in the polyisocyanate component is at least about 0.9:1, at least about 0.95:1, at least about 1:1, at least about 1.01:1, at least about 1.05:1, at least about 1.1:1, at least about 1.15:1, or at least about 1.2:1.

Embodiment A31 is the herbicidal microcapsule of any one of embodiments A27 to A29 wherein the ratio of amine molar equivalents contained in the polyamine component to isocyanate molar equivalents contained in the polyisocyanate component is from about 0.9:1 to about 1.7:1, from about 0.9:1 to about 1.6:1, from about 0.9:1 to about 1.5:1, from about 0.9:1 to about 1.4:1, from about 0.9:1 to about 1.3:1, from about 0.9:1 to about 1.2:1, from about 0.9:1 to about 1.1:1, from about 0.95:1 to about 1.7:1, from about 0.95:1 to about 1.6:1, from about 0.95:1 to about 1.5:1, from about 0.95:1 to about 1.4:1, from about 0.95:1 to about 1.3:1, from about 0.95:1 to about 1.2:1, from about 0.95:1 to about 1.1:1, from about 1:1 to about 1.7:1, from about 1:1 to about 1.6:1, from about 1:1 to about 1.5:1, from about 1:1 to about 1.4:1, from about 1:1 to about 1.3:1, from about 1.01:1 to about 1.7:1, from about 1.01:1 to about 1.6:1, from about 1.01:1 to about 1.5:1, from about 1.01:1 to about 1.4:1, from about 1.01:1 to about 1.3:1, from about 1.05:1 to about 1.7:1, from about 1.05:1 to about 1.6:1, from about 1.05:1 to about 1.5:1, from about 1.05:1 to about 1.4:1, or from about 1.05:1 to about 1.3:1, from about 1.1:1 to about 1.7:1, from 1.1:1 to about 1.6:1, from 1.1:1 to about 1.5:1, from 1.1:1 to about 1.4:1, from 1.1:1 to about 1.3:1, from about 1.15:1 to about 1.7:1, from about 1.15:1 to about 1.6:1, from about 1.15:1 to about 1.5:1, from about 1.15:1 to about 1.4:1, from about 1.15:1 to about 1.3:1, from 1.2:1 to about 1.7:1, from 1.2:1 to about 1.6:1, from 1.2:1 to about 1.5:1, from 1.2:1 to about 1.4:1, or from 1.2:1 to about 1.3:1.

Embodiment A32 is the herbicidal microcapsule of any one of embodiments A1 to A31 wherein a population of the microcapsules have a mean particle size range of from about 2 μm to about 15 μm, from about 2 μm to about 12 μm, from about 2 μm to about 10 μm, from about 2 μm to about 8 μm, from about 3 μm to about 15 μm, from about 3 μm to about 10 μm, from about 3 μm to about 8 μm, from about 4 μm to about 15 μm, from about 4 μm to about 12 μm, from about 4 μm to about 10 μm, from about 4 μm to about 8 μm, or from about 4 μm to about 7 μm.

Embodiment B1 is the aqueous herbicidal composition comprising herbicidal microcapsules of any one of embodiments A1 to A32, which are dispersed in an aqueous liquid medium.

Embodiment B2 is the aqueous herbicidal composition of embodiment B1 wherein the aqueous herbicidal composition further comprises at least one additional herbicide.

Embodiment B3 is the aqueous herbicidal composition of embodiment B2 wherein the additional herbicide comprises a water-soluble herbicide.

Embodiment B4 is the aqueous herbicidal composition of embodiment B2 or B3 wherein the additional herbicide comprises at least one herbicide selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, hydroxyphenylpyruvate dioxygenase (HPPD) inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof.

Embodiment B5 is the aqueous herbicidal composition of any one of embodiments B2 to B4 wherein the additional herbicide comprises at least one auxin herbicide selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5- trichlorophenoxyacetic acid (2,4,5-T); aminopyralid; clopyralid; fluroxypyr; triclopyr; mecoprop; picloram; quinclorac; aminocyclopyrachlor; and salts and esters thereof, and mixtures thereof.

Embodiment B6 is the aqueous herbicidal composition of any one of embodiments B2 to B5 wherein the additional herbicide comprises a salt of dicamba.

Embodiment B7 is the aqueous herbicidal composition of any one of embodiments B2 to B6 wherein the additional herbicide comprises a salt of 2,4-D.

Embodiment B8 is the aqueous herbicidal composition of any one of embodiments B2 to B7 wherein the additional herbicide comprises glyphosate or a salt or ester thereof.

Embodiment B9 is the aqueous herbicidal composition of any one of embodiments B2 to B8 wherein the additional herbicide comprises glufosinate or a salt or ester thereof.

Embodiment B10 is the aqueous herbicidal composition of any one of embodiments B2 to B9 wherein the additional herbicide comprises at least one PPO inhibitor selected from the group consisting of acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil, sulfentrazone, ethyl 2-((3-(2-chloro-4-fluoro-5-(3-methyl-2,6-dioxo-4-(trifluoromethyl)-3,6-dihydropyrimidin-1(2H)-yl)phenoxy) pyridin-2-yl)oxy)acetate, salts and esters thereof, and mixtures thereof.

Embodiment B11 is the aqueous herbicidal concentrate composition of any one of embodiments B2 to B10 wherein the additional herbicide comprises sodium fomesafen.

Embodiment B12 is the aqueous herbicidal concentrate composition of any one of embodiments B2 to B11 wherein the additional herbicide comprises a HPPD inhibitor.

Embodiment B13 is the aqueous herbicidal concentrate composition of any one of embodiments B2 to B12 wherein the additional herbicide comprises at least one HPPD inhibitor selected from the group consisting of aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione and topramezone, salts and esters thereof, and mixtures thereof.

Embodiment B14 is the aqueous herbicidal composition of any one of embodiments B2 to B13 wherein the weight ratio of total microencapsulated herbicide to additional herbicide is from about 1:30 to about 30:1, from about 1:20 to about 20:1, from about 1:10 to about 10:1, from about 1:8 to about 8:1, from about 1:5 to about 5:1, from about 1:1 to about 30:1, from about 1:1 to about 20:1, from about 1:1 to about 10:1, from about 1:1 to about 8:1, from about 1:1 to about 5:1, from about 1:1 to about 3:1, from about 2:1 to about 30:1, from about 2:1 to about 20:1, from about 2:1 to about 10:1, from about 2:1 to about 8:1, from about 2:1 to about 5:1, from about 2:1 to about 3:1, from about 1:1.5 to about 30:1, from about 1:1.5 to about 20:1, from about 1:1.5 to about 15:1, from about 1:1.5 to about 10:1, from about 1:1.5 to about 8:1, from about 1:1.5 to about 5:1, or from about 1:1.5 to about 3:1.

Embodiment B15 is the aqueous herbicidal composition of any one of embodiments B1 to B14 wherein the composition further comprises a safener.

Embodiment B16 is the aqueous herbicidal composition of embodiment B15 wherein the safener is selected from the group consisting of furilazole ((RS)-3 (dichloroacetyl) 5 (2 furanyl) 2,2 dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy) acetic acid); cyometrinil ((Z)-cyanomethoxyimino(phenyl) acetonitrile); cyprosulfamide (N-[4-(cyclopropylcarbamoyl) phenylsulfonyl]-o-anisamide); dichlormid (N,N-diallyl-2,2-dichloroacetamide); dicyclonon ((RS)-1-dichloroacetyl-3,3,8a-trimethylperhydropyrrolo[1,2-a]pyrimidin-6-one); dietholate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino(phenyl)acetonitrile); isoxadifen (4,5-dihydro-5,5-diphenyl-1,2-oxazole-3-carboxylic acid); cyprosulfamide; salts and esters thereof, and mixtures thereof.

Embodiment B17 is the aqueous herbicidal composition of any one of embodiments B1 to B16 wherein the composition is an aqueous herbicidal concentrate composition containing at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % of the microencapsulated herbicides (acetamide herbicide and second herbicide) on an active ingredient basis.

Embodiment B18 is the aqueous herbicidal composition of any one of embodiments B1 to B17 wherein the composition is an aqueous herbicidal concentrate composition containing from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. % of the microencapsulated herbicides (acetamide herbicide and second herbicide) on an active ingredient basis.

Embodiment B19 is the aqueous herbicidal composition of any one of embodiments B1 to B18 wherein the total acetamide concentration is at least about 15 wt. %, at least about 20 wt. %, at least about 25 wt. %, at least about 30 wt. %, or at least about 35 wt. %.

Embodiment B20 is the aqueous herbicidal composition of any one of embodiments B1 to B19 wherein the total acetamide concentration is from about 15 wt. % to about 40 wt. %, from about 20 wt. % to about 40 wt. %, from about 20 wt. % to about 35 wt. %, from about 20 wt. % to about 30 wt. %, from about 25 wt. % to about 40 wt. %, from about 25 wt. % to about 35 wt. %, from about 30 wt. % to about 40 wt. %, or from about 30 wt. % to about 35 wt. %.

Embodiment B21 is the aqueous herbicidal composition of any one of embodiments B1 to B20 wherein the total second herbicide concentration is from about 1 wt. % to about 20 wt. %, from about 2 wt. % to about 20 wt. %, from about 5 wt. % to about 20 wt. %, from about 1 wt. % to about 15 wt. %, from about 2 wt. % to about 15 wt. %, from about 5 wt. % to about 15 wt. %, from about 1 wt. % to about 10 wt. %, from about 2 wt. % to about 10 wt. %, or from about 5 wt. % to about 10 wt. %.

Embodiment C1 is a method for controlling weeds in a field of a crop plant, the method comprising applying to the field an application mixture comprising either (a) the herbicidal microcapsules of any one of embodiments A1 to A32 or (b) the aqueous herbicidal composition of any one of embodiments B1 to B21 or dilution thereof.

Embodiment C2 is the method of embodiment C1 wherein the crop plant comprises corn.

Embodiment C3 is the method of embodiment C1 or C2 wherein the crop plant comprises soybeans.

Embodiment C4 is the method of any one of embodiments C1 to C3 wherein the crop plant comprises wheat.

Embodiment C5 is the method of any one of embodiments C1 to C4 wherein the crop plant comprises barley.

Embodiment C6 is the method of any one of embodiments C1 to C5 wherein the application mixture is applied to the field (i) prior to planting the crop plant or (ii) pre-emergence to the crop plant.

Embodiment C7 is the method of any one of embodiments C1 to C5 wherein the application mixture is applied to the field post-emergence to the crop plant.

Embodiment C8 is the method of any one of embodiments s C1 to C7 wherein the acetamide herbicide is applied at a use rate of at least about 100 g/ha (grams of active ingredient per hectare), at least about 250 g/ha, at least about 500 g/ha, or at least about 1000 g/ha.

Embodiment C9 is the method of any one of embodiments C1 to C7 wherein the acetamide herbicide is applied at a use rate of from about 100 g/ha to about 5000 g/ha, from about 250 g/ha to about 5000 g/ha, from about 500 g/ha to about 5000 g/ha, from about 1000 g/ha to about 5000 g/ha, from about 100 g/ha to about 3000 g/ha, from about 250 g/ha to about 5000 g/ha, from about 500 g/ha to about 3000 g/ha, from about 1000 g/ha to about 3000 g/ha, from about 100 g/ha to about 2000 g/ha, from about 250 g/ha to about 2000 g/ha, from about 500 g/ha to about 2000 g/ha, from about 1000 g/ha to about 2000 g/ha, or from about 1200 g/ha to about 2000 g/ha.

Embodiment C10 is the method of any one of embodiments C1 to C9 wherein the second herbicide is applied at a use rate of at least about 25 g/ha (grams acid ingredient per hectare), at least about 50 g/ha, at least about 100 g/ha, at least about 150 g/ha, at least about 200 g/ha, or at least about 250 g/ha.

Embodiment C11 is the method of any one of embodiments C1 to C9 wherein the second herbicide is applied at a use rate of from about 25 g/ha to about 1000 g/ha, from about 50 g/ha to about 600 g/ha, from about 100 g/ha to about 600 g/ha, or from about 100 g/ha to about 300 g/ha.

Embodiment C12 is the method of any one of embodiments C1 to C11 wherein the application mixture comprises an additional herbicide.

Embodiment C13 is the method of embodiment C12 wherein the additional herbicide is applied at a use rate of at least about 50 g/ha (grams acid equivalent per hectare), at least about 100 g/ha, at least about 500 g/ha, at least about 1000 g/ha, at least about 1500 g/ha, at least about 2000 g/ha, at least about 2500 g/ha, or at least about 3000 g/ha.

Embodiment C14 is the method of any one of embodiments C1 to C12 wherein the additional herbicide is applied at a use rate of from about 100 g/ha (grams acid equivalent per hectare) to about 5000 g/ha, from about 500 g/ha to about 2500 g/ha, from about 500 g/ha to about 2000 g/ha, from about 100 g/ha to about 1000 g/ha, from about 250 g/ha to about 1000 g/ha, or from about 250 g/ha to about 900 g/ha.

Embodiment C15 is the method of any one of embodiments C10 to C14 wherein the additional herbicide comprises at least one herbicide selected from the group consisting of flumioxazin, fluometuron, diuron, sulfentrazone, fomesafen, saflufenacil, thiencarbazone, mesotrione, atrazine, isoxaflutole, 2,4-D, dicamba, glyphosate, salts and esters thereof, racemic mixtures and resolved isomers thereof, and mixtures thereof.

Embodiment C16 is the method of embodiment C1 wherein the second herbicide is metribuzin.

Embodiment C17 is the method of embodiment C16 wherein the crop plant comprises corn.

Embodiment C18 is the method of embodiment C17 wherein the application mixture is applied to the field (i) prior to planting the corn or (ii) pre-emergence to the corn.

Embodiment C19 is the method of embodiment C17 wherein the application mixture is applied to the field post-emergence to the corn.

Embodiment C20 is the method of any one of embodiments C17 to C19 wherein the field is characterized by a soil pH of 7.0 or greater, about 7.2 or greater, about 7.5 or greater, about 8 or greater, or ranges from about 7.2 to about 9 or from about 7.2 to about 9.

Embodiment C21 is the method of any one of embodiments C17 to C20 wherein the field is characterized by soil having an organic matter content that is less than about 1.5% or from about 0.1% to about 1.5% or from about 0.5% to about 1.5%.

Embodiment C22 is the method of embodiment C16 wherein the crop plant comprises soybeans.

Embodiment C23 is the method of embodiment C22 wherein the field is characterized by a soil pH of 7.0 or greater, about 7.2 or greater, about 7.5 or greater, about 8 or greater, or ranges from about 7.2 to about 8.5 or from about 7.2 to about 8.

Embodiment C24 is the method of embodiment C22 or C23 wherein the field is characterized by soil having an organic matter content that is less than about 0.5%.

Embodiment C25 is the method of any one of embodiments C22 to C24 wherein the application mixture is applied to the field (i) prior to planting the soybeans or (ii) pre-emergence to the soybeans.

Embodiment C26 is the method of embodiment C25 wherein the soybeans comprise at least one soybean variety that is moderately tolerant to metribuzin.

Embodiment C27 is the method of embodiment C25 or C26 wherein the soybeans comprise at least one soybean variety that is moderately sensitive to metribuzin.

Embodiment C28 is the method of any one of embodiments C25 to C27 wherein the soybeans comprise at least one soybean variety that is sensitive to metribuzin.

Embodiment C29 is the method of any one of embodiments C25 to C28 wherein the crop injury is less than about 20%, less than about 15%, less than about 10% or less than about 5% as measured at about 14 and/or 21 days after treatment (DAT).

Embodiment C30 is the method of any one of embodiments C25 to C29 wherein the metribuzin is applied at a use rate of no greater than about 600 g/ha (grams active ingredient per hectare), no greater than about 560 g/ha, no greater than about 420 g/ha, or no greater than about 300 g/ha.

Embodiment C31 is the method of any one of embodiments C25 to C29 wherein the metribuzin is applied at a use rate of from about 200 g/ha (grams active ingredient per hectare) to about 600 g/ha, from about 280 g/ha to about 560 g/ha or from about 280 g/ha to about 420 g/ha.

Embodiment C32 is the method of any one of embodiments C22 to C24 wherein the application mixture is applied to the field post-emergence to the soybeans.

Embodiment C33 is the method of embodiment C32 wherein the soybeans comprise at least one soybean variety that is tolerant to metribuzin.

Embodiment C34 is the method of embodiment C32 or C33 wherein the soybeans comprise at least one soybean variety that is moderately tolerant to metribuzin.

Embodiment C35 is the method of any one of embodiments C32 to C34 wherein the soybeans comprise at least one soybean variety that is moderately sensitive to metribuzin.

Embodiment C36 is the method of any one of embodiments C32 to C35 wherein the soybeans comprise at least one soybean variety that is sensitive to metribuzin.

Embodiment C37 is the method of any one of embodiments C32 to C36 wherein the crop injury is less than about 20%, less than about 15%, less than about 10% or less than about 5% as measured at about 14 and/or 21 days after treatment (DAT).

Embodiment C38 is the method of any one of embodiments C32 to C37 wherein the metribuzin is applied at a use rate of no greater than about 600 g/ha (grams active ingredient per hectare), no greater than about 560 g/ha, no greater than about 420 g/ha, no greater than about 300 g/ha, no greater than about 280 g/ha, or no greater than about 250 g/ha.

Embodiment C39 is the method of any one of embodiments C32 to C37 wherein the metribuzin is applied at a use rate of from about 50 g/ha (grams active ingredient per hectare) to about 600 g/ha, from about 50 g/ha to about 560 g/ha, from about 50 g/ha to about 420 g/ha, from about 50 g/ha to about 300 g/ha, from about 50 g/ha to about 280 g/ha, from about 50 g/ha to about 250 g/ha, from about 50 g/ha to about 200 g/ha, from about 100 g/ha to about 600 g/ha, from about 100 g/ha to about 560 g/ha, from about 100 g/ha to about 420 g/ha, from about 100 g/ha to about 300 g/ha, from about 100 g/ha to about 280 g/ha, from about 100 g/ha to about 250 g/ha, from about 100 g/ha to about 200 g/ha, from about 150 g/ha to about 600 g/ha, from about 150 g/ha to about 560 g/ha, from about 150 g/ha to about 420 g/ha, from about 150 g/ha to about 300 g/ha, from about 150 g/ha to about 280 g/ha, or from about 150 g/ha to about 250 g/ha.

Embodiment C40 is the method of any one of embodiments C1 to C39 wherein the application mixture further comprises a salt of dicamba.

Embodiment C41 is the method of any one of embodiments C1 to C40 wherein the acetamide herbicide is acetochlor.

Embodiment C43 is the method of any one of embodiments C1 to C41 wherein the application mixture is applied to the field via over-the-top spraying.

Embodiment D1 is a method for controlling weeds, the method comprising:

applying to a field an application mixture comprising a salt of dicamba and herbicidal microcapsules comprising a core material and a shell wall encapsulating the core material, wherein the core material comprises an acetamide herbicide and a second herbicide comprising metribuzin and at least a portion of the metribuzin is dissolved in the acetamide herbicide, and wherein the shell wall comprises a polyurea.

Embodiment D2 is the method of embodiment D1 wherein residual weed control is such that a commercially acceptable rate of weed control of at least about 90%, at least about 92%, or at least about 95% can be achieved at about 28 days after treatment (DAT).

Embodiment D3 is the method of embodiment D1 or D2 wherein residual weed control is such that a commercially acceptable rate of weed control of at least about 85%, at least about 87%, or at least about 90%, at least about 92% can be achieved at about 42 days after treatment (DAT).

Embodiment D4 is the method of any one of embodiments D1 to D3 wherein the rate of weed control is achieved for at least one broadleaf weeds selected from the group consisting of Velvetleaf (*Abutilon theophrasti*), Common Waterhemp (*Amaranthus rudis*), Tall Waterhemp (*Amaranthus tuberculatus*), Redroot Pigweed (*Amaranthus retroflexus*) and other weed species within the *Amaranthus* genus, Common Purslane (*Portulaca oleracea*) and other weed species in the *Portulaca* genus, Morning Glory (*Ipomoca* spp.), *Sesbania exaltata* spp., Venice Mallow (*Hibiscus trionum*), Prickly sida (*Sida spinosa*), *Desmodium* spp., *Mollugo verticillata*, and combinations thereof.

Embodiment D5 is the method of any one of embodiments D1 to D4 wherein the acetamide herbicide is applied at a use rate of from about 100 g/ha (grams active ingredient per hectare) to about 5000 g/ha, from about 250 g/ha to about 5000 g/ha, from about 500 g/ha to about 5000 g/ha, from about 1000 g/ha to about 5000 g/ha, from about 500 g/ha to about 3000 g/ha, from about 250 g/ha to about 5000 g/ha, from about 500 g/ha to about 3000 g/ha, from about 1000 g/ha to about 3000 g/ha, from about 100 g/ha to about 2000 g/ha, from about 250 g/ha to about 2000 g/ha, from about 500 g/ha to about 2000 g/ha, from about 1000 g/ha to about 3000 g/ha, or from about 1000 g/ha to about 2000 g/ha.

Embodiment D6 is the method of any one of embodiments D1 to D5 wherein the metribuzin is applied at a use rate of from about 200 g/ha (grams active ingredient per hectare) to about 600 g/ha, from about 280 g/ha to about 560 g/ha or from about 280 g/ha to about 420 g/ha.

Embodiment D7 is the method of any one of embodiments D1 to D6 wherein the salt of dicamba is applied at a use rate is from about 100 g/ha (grams acid equivalent per hectare) to about 1000 g/ha, from about 250 g/ha to about 1000 g/ha, or from about 250 g/ha to about 900 g/ha.

Embodiment E1 is a process for preparing the herbicidal microcapsules of any one of embodiments A1 to A32, the process comprising:

mixing an acetamide herbicide and a second herbicide to form a mixture wherein at least a portion of the second herbicide dissolves in the acetamide herbicide; and encapsulating a core material comprising the mixture of the acetamide herbicide and the second herbicide in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions, methods and processes without departing from the scope of the invention, it is intended that all matter contained in the above description and shown in the accompanying drawings shall be interpreted as illustrative and not in a limiting sense.

Having described the invention in detail, it will be apparent that modifications and variations are possible without departing from the scope of the invention defined in the appended claims.

What is claimed is:

1. A herbicidal microcapsule comprising:
   a core material comprising an acetamide herbicide and a second herbicide comprising isoxaflutole, wherein at least about 20 wt % of the second herbicide is dissolved in the acetamide herbicide and wherein the weight ratio of the acetamide herbicide to the second herbicide in the core material is at least about 2:1; and
   a shell wall encapsulating the core material, wherein the shell wall comprises a polyurea formed by polymerization of a polyisocyanate component comprising a polyisocyanate or mixture of polyisocyanates and a polyamine component comprising a polyamine or mixture of polyamines to form the polyurea, wherein the polyisocyanate comprises an aliphatic polyisocyanate.

2. The herbicidal microcapsule of claim 1 wherein the acetamide herbicide comprises at least one herbicide selected from the group consisting of acetochlor, alachlor, butachlor, butenachlor, delachlor, diethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof.

3. The herbicidal microcapsule of claim 1 wherein the acetamide herbicide comprises acetochlor.

4. The herbicidal microcapsule of claim 1 wherein the second herbicide has a water solubility no greater than 0.4 wt. %.

5. The herbicidal microcapsule of claim 1 wherein the weight ratio of the acetamide herbicide to the second herbicide in the core material is from about 2:1 to about 300:1.

6. The herbicidal microcapsule of claim 1 wherein from about 20 wt. % to about 99 wt. % of the total amount of second herbicide is dissolved in the acetamide herbicide.

7. The herbicidal microcapsule of claim 1 wherein acetamide herbicide constitutes from about 10 wt. % to about 65 wt. % of the microcapsule.

8. The herbicidal microcapsule of claim 1 wherein the core material further comprises a safener selected from the group consisting of furilazole ((RS)-3 (dichloroacetyl) 5 (2 furanyl) 2,2 dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy) acetic acid); cyometrinil ((Z)-cyanomethoxyimino (phenyl) acetonitrile); cyprosulfamide (N-[4-(cyclopropylcarbamoyl) phenylsulfonyl]-o-anisamide); dichlormid (N, N-diallyl-2,2-dichloroacetamide); dicyclonon ((RS)-1-dichloroacetyl-3,3,8a-trimethylperhydropyrrolo [1,2-a]pyrimidin-6-one); dietholate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino (phenyl) acetonitrile); isoxadifen (4,5-dihydro-5,5-diphenyl-1,2-oxazole-3-carboxylic acid); cyprosulfamide; salts and esters thereof; and mixtures thereof.

9. The herbicidal microcapsule of claim 1 wherein the ratio of amine molar equivalents contained in the polyamine component to isocyanate molar equivalents contained in the polyisocyanate component is from about 0.9:1 to about 1.7:1.

10. The herbicidal microcapsule of claim 1 wherein a population of the microcapsules have a mean particle size range of from about 2 μm to about 15 μm.

11. An aqueous herbicidal composition comprising herbicidal microcapsules of claim 1, which are dispersed in an aqueous liquid medium.

12. The aqueous herbicidal composition of claim 11 wherein the aqueous herbicidal composition further comprises at least one additional herbicide selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, hydroxyphenylpyruvate dioxygenase (HPPD) inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof.

13. The aqueous herbicidal composition of claim 12 wherein the additional herbicide comprises at least one auxin herbicide selected from the group consisting of 3,6-dichloro-2-methoxybenzoic acid (dicamba); 2,4-dichlorophenoxyacetic acid (2,4-D); 4-(2,4-dichlorophenoxy) butyric acid (2,4-DB); dichloroprop; 2-methyl-4-chlorophenoxyacetic acid (MCPA); 4-(4-chloro-2-methylphenoxy) butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; and salts and esters thereof, and mixtures thereof.

14. The aqueous herbicidal composition of claim 11 wherein the composition is an aqueous herbicidal concentrate composition containing from about 10 wt. % to about 65 wt. % of the microencapsulated herbicides (acetamide herbicide and second herbicide) on an active ingredient basis.

15. The aqueous herbicidal composition of claim 11 wherein the total acetamide concentration is at least about 15 wt. %.

16. A method for controlling weeds in a field of a crop plant, the method comprising applying to the field an application mixture comprising the herbicidal microcapsule of claim 1.

17. A method for controlling weeds, the method comprising: applying to a field an application mixture comprising a salt of dicamba and herbicidal microcapsules comprising a core material and a shell wall encapsulating the core material, wherein the core material comprises an acetamide herbicide and a second herbicide comprising isoxaflutole and at least about 20 wt % of the isoxaflutole is dissolved in the acetamide herbicide, wherein the weight ratio of the acetamide herbicide to the second herbicide in the core material is at least about 2:1 and wherein the shell wall comprises a polyurea formed by polymerization of a polyisocyanate component comprising a polyisocyanate or mixture of polyisocyanates and a polyamine component comprising a polyamine or mixture of polyamines to form the polyurea, wherein the polyisocyanate comprises an aliphatic polyisocyanate.

18. A process for preparing the herbicidal microcapsule of claim 1, the process comprising:
 mixing an acetamide herbicide and the second herbicide to form a mixture; and
 encapsulating a core material comprising the mixture of the acetamide herbicide and the second herbicide in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium.

19. The herbicidal microcapsule of claim 1, wherein the acetamide herbicide is selected from the group consisting of acetochlor, metolachlor, S-metolachlor, dimethenamid, dimethenamid-P, stereoisomers thereof, and mixture thereof.

\* \* \* \* \*